United States Patent
Wakikawa et al.

(10) Patent No.: US 8,897,806 B2
(45) Date of Patent: Nov. 25, 2014

(54) DYNAMIC DATA PUBLICATION AND DISSEMINATION

(71) Applicant: Toyota Jidosha Kabushiki Kaisha, Toyota-shi, Aichi-ken (JP)

(72) Inventors: Ryuji Wakikawa, Mountain View, CA (US); Rama Krishna Vuyyuru, Somerset, NJ (US); Romain Kuntz, Menlo Park, CA (US)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 205 days.

(21) Appl. No.: 13/647,252

(22) Filed: Oct. 8, 2012

(65) Prior Publication Data

US 2013/0258878 A1 Oct. 3, 2013

Related U.S. Application Data

(60) Provisional application No. 61/616,287, filed on Mar. 27, 2012.

(51) Int. Cl.
*G08G 1/00* (2006.01)
*G08G 1/01* (2006.01)

(52) U.S. Cl.
CPC ............ *G08B 1/0116* (2013.01); *G08G 1/0133* (2013.01)
USPC ....................................... 455/456.1

(58) Field of Classification Search
USPC .......... 455/414.3, 456.1, 456.3; 701/117–119
See application file for complete search history.

(56) References Cited

U.S. PATENT DOCUMENTS

| 5,801,943 A * | 9/1998 | Nasburg .......................... 701/117 |
| 2005/0030202 A1 | 2/2005 | Tsuboi |
| 2005/0065711 A1* | 3/2005 | Dahlgren et al. ............. 701/117 |
| 2006/0184322 A1* | 8/2006 | Kim ............................. 701/211 |
| 2009/0122738 A1 | 5/2009 | Chen et al. |
| 2010/0238009 A1* | 9/2010 | Cook et al. .................... 340/439 |

(Continued)

FOREIGN PATENT DOCUMENTS

| JP | 2006281850 | 10/2006 |
| JP | 2009147652 | 7/2009 |

(Continued)

OTHER PUBLICATIONS

Harsch, Charles et al., "Secure Position-Based Routing for VANETs," Vehicular Technology Conference, Sep. 1, 2007, 6 pages.

(Continued)

*Primary Examiner* — Kerri Rose

(74) *Attorney, Agent, or Firm* — Patent Law Works LLP

(57) ABSTRACT

A system for dynamic data publication and dissemination in a mobile node network is disclosed. The system comprises a collection module, a naming module and a publishing module. The collection module collects sensor data and detects a road event based at least in part on the sensor data. The collection module generates event data that describes the road event. The naming module converts the event data to a set of naming data that conforms to a naming structure. The naming structure includes an application identifier that identifies an application for the road event and a location that identifies a geographical scope for the road event. The naming module caches the set of naming data in a storage device. The publishing module publishes the set of naming data in the mobile node network.

28 Claims, 13 Drawing Sheets

(56) References Cited

U.S. PATENT DOCUMENTS

| | | |
|---|---|---|
| 2011/0282566 A1 | 11/2011 | Kawauchi et al. |
| 2012/0253646 A1* | 10/2012 | Reghunath ............... 701/117 |
| 2013/0024060 A1* | 1/2013 | Sukkarie et al. ............ 701/22 |

FOREIGN PATENT DOCUMENTS

| | | |
|---|---|---|
| JP | 2010237934 | 10/2010 |
| JP | 2010288276 | 12/2010 |
| JP | 2011091534 | 5/2011 |
| JP | 2012015714 | 1/2012 |
| JP | 2012039639 | 2/2012 |
| WO | 2011142226 | 11/2011 |

OTHER PUBLICATIONS

Wang, Lucas et al., "Data Naming in Vehicle-to-Vehicle Communications," Computer Communications Workshops, 2012 IEEE Conference on Computer Communications Workshops, Mar. 25, 2012, pp. 328-333.

International Search Report and Written Opinion of PCT/JP2012/056203, mailed Jul. 19, 2013, 14 pages.

* cited by examiner

DYNAMIC DATA PUBLICATION AND DISSEMINATION

CROSS REFERENCE TO RELATED APPLICATIONS

This application claims priority under 35 USC §119(e) to U.S. Application No. 61/616,287, entitled "Dynamic Data Publication in A Mobile Network" filed Mar. 27, 2012, the entirety of which is herein incorporated by reference.

BACKGROUND

The specification relates to data publication and dissemination. In particular, the specification relates to dynamic data publication and dissemination in a mobile node network.

Vehicular networking becomes more and more popular. For example, existing technologies use transmission control protocol/internet protocol (TCP/IP) to implement vehicular communications such that vehicles communicate with a centralized server through cellular networks or other wireless networks. However, various vehicular applications such as applications related to driving safety or applications using real-time traffic information require direct vehicle-to-vehicle (V2V) communications or vehicle-to-road-side-unit (V2R) communications which is difficult to implement using TCP/IP protocols.

Furthermore, existing technologies require infrastructure support to allocate IP addresses before data communication. However, in ad hoc communication scenarios such as V2V or V2R communications, it is infeasible to assume the availability of the infrastructure support. The mobility of the vehicles further complicates data communication since constant connection changes are required if existing technologies are applied. For example, the constant connection changes require sessions to be re-established and routes to be re-calculated frequently, which is very inefficient for data communication.

SUMMARY

A system for dynamic data publication and dissemination in a mobile node network is disclosed. The system comprises a collection module, a naming module and a publishing module. The collection module collects sensor data and detects a road event based at least in part on the sensor data. The collection module generates event data that describes the road event. The naming module converts the event data to a set of naming data that conforms to a naming structure. The naming structure includes an application identifier that identifies an application for the road event and a location that identifies a geographical scope of the road event. The naming module caches the set of naming data in a storage device. The publishing module publishes the set of naming data in the mobile node network.

The system is particularly advantageous in numerous respects. First, the system provides dynamic data publication and dissemination among a variety of mobile nodes. The system provides a request/reply model such that communication in a mobile node network as described in the disclosure does not require allocation of network addresses, setup of delivery paths or session establishment before data communication occurs. The system also does not require end-to-end connections for the data communication. Second, the system supports real-time data publication and dissemination for location-specific road events among a variety of nodes. Third, the system provides an efficient approach to use named data networking techniques in vehicular communications (e.g., V2V or V2R communications) with no TCP/IP implementations.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
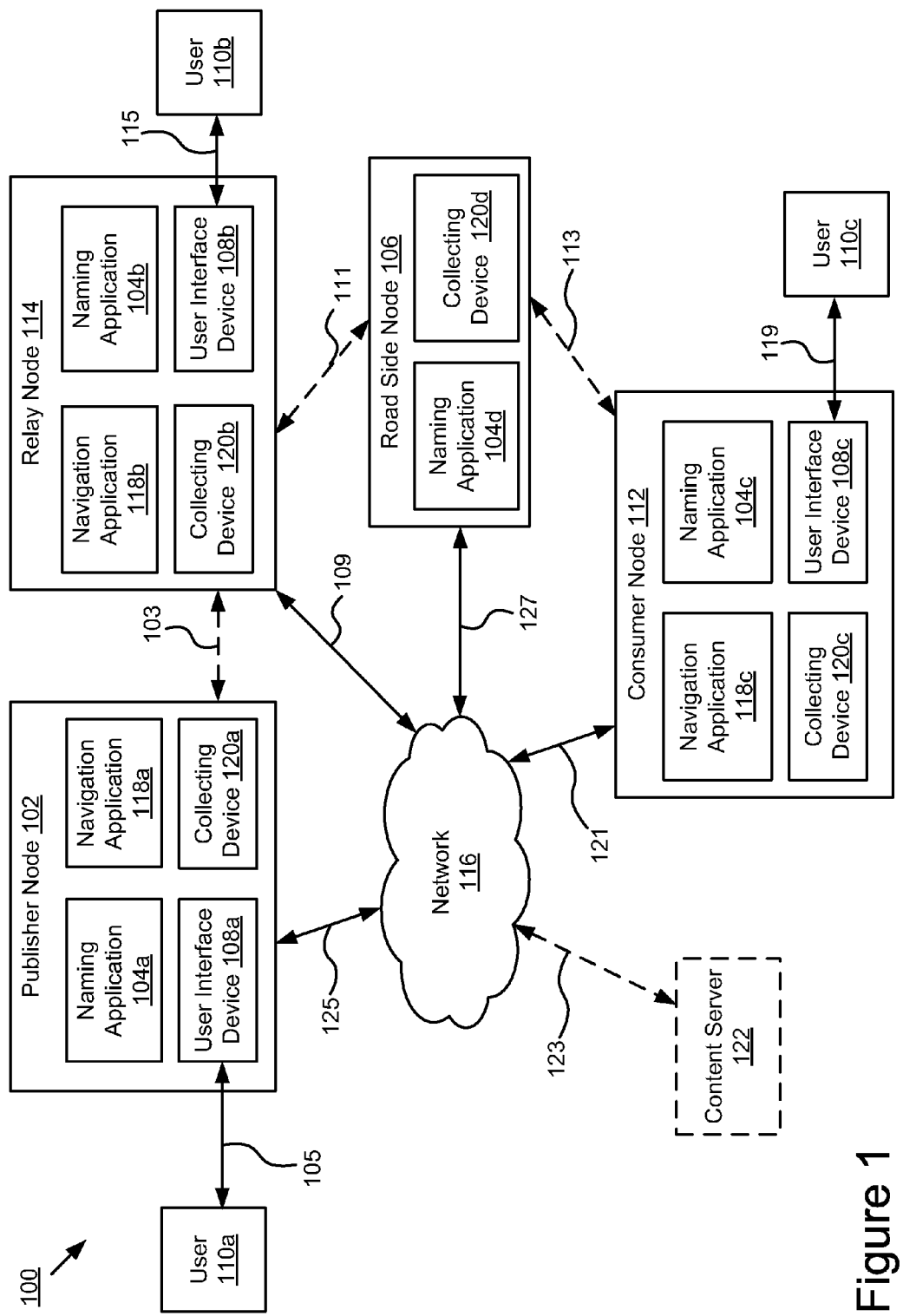
FIG. 1 is a high-level block diagram illustrating a system for dynamic data publication and dissemination in a mobile node network according to one embodiment.

A system and method for dynamic data publication and dissemination in a mobile node network is described below. In the following description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, compact disc read-only memories (CD-ROMs), magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 is a high-level block diagram illustrating a system 100 for dynamic data publication and dissemination in a mobile node network according to one embodiment. In the illustrated embodiment, the system 100 includes a publisher node 102, a relay node 114, a road side node 106 and a consumer node 112. Although only one publisher node 102, one relay node 114, one road side node 106 and one consumer node 112 are illustrated in FIG. 1, the system 100 may include any number of publisher nodes 102, relay nodes 114, road side nodes 106 and consumer nodes 112.

In the illustrated embodiment, the entities of the system 100 are communicatively coupled by a network 116. For example, the publisher node 102 is communicatively coupled to the network 116 via signal line 125. The relay node 114 is communicatively coupled to the network 116 via signal line 109. The road side node 106 is communicatively coupled to the network 116 via signal line 127. The consumer node 112 is communicatively coupled to the network 116 via signal line 121. In one embodiment, each of signal lines 125, 109, 127 and 121 represents a wireless connection such as a connection using one or more of Dedicated Short Range Communications (DSRC), Wireless Access in Vehicular Environments (WAVE), 802.11p, a 3G network, a 4G network, WiFi or any other wireless networks. In one embodiment, the entities of the system 100 are optionally coupled to each other directly. For example, the publisher node 102 is optionally coupled to the relay node 114 via signal line 103. The relay node 114 is optionally coupled to the road side node 106 via signal line 111. The road side node 106 is optionally coupled to the consumer node 112 via signal line 113.

In one embodiment, one or more of the publisher node 102, the relay node 114 and the consumer node 112 are mobile nodes (e.g., vehicles) whose locations change over time. A mobile node network is a network including mobile nodes. In one embodiment, the mobile node network is an ad hoc network including one or more mobile nodes connected to each other wirelessly. For example, the mobile node network includes one or more nodes equipped with wireless radios. In one embodiment, the mobile node network includes one or more mobile nodes and/or road side nodes 106 connected to each other via one or more of a wireless local area network, a DSRC network, a WAVE network, a 3G network, a 4G network or any other wireless network.

In one embodiment, the mobile node network conforms to a named data networking architecture. A named data networking architecture is a computer network architecture that focuses on content distributed to or retrieved from the computer network. For example, the named data networking architecture is a content-centric networking architecture that focuses on what content a consumer node 112 is interested in (e.g., what a consumer node 112 wants) and what content a publisher node 102 publishes (e.g., what content a publisher node 102 has). The named data networking architecture does not refer to any specific location (e.g., IP address) to retrieve the content. The requesting nodes in the named data networking architecture requests the content from neighbor nodes by sending interest requests to the neighbor nodes. If the neighbor nodes have reply data matching to the interest requests, the neighbor nodes sends the reply data to the requesting nodes. This content retrieval approach involving interest request and interest reply is referred to as a request/reply model. There is no end-to-end network connection and no specific network address required for a node to publish content and/or retrieve content in the named data networking architecture.

The publisher node 102 is an entity that publishes data in a mobile node network. For example, the publisher node 102 is a vehicle or a road side unit that detects a road event and distributes the road event to other nodes (e.g., relay nodes 114, road side nodes 106 and consumer nodes 112, etc.) in a mobile node network. A road event is an event occurred on a road such as a road closure, an accident on a road, traffic condition on a road (e.g., congestion, heavy traffic, current traffic speed, etc.), road construction, weather condition on a road (e.g., icy road, raining and/or foggy weather, etc.), etc.

In one embodiment, the publisher node 102 detects a road event, collects event data describing the road event and stores the event data. Event data is data that describes a road event. In one embodiment, the publisher node 102 collects one or more sets of event data and aggregates the one or more sets of event data. The aggregated event data describes a road event. The publisher node 102 publishes the road event in a mobile node network. For example, the publisher node 102 distributes the road event to other nodes (e.g., the road side node 106, the relay node 114, the consumer node 112, etc.). In another example, the publisher node 102 distributes event data describing the road event or naming data corresponding to the event data to one or more other nodes. The naming data is described below with reference to FIG. 2. In one embodiment, the publisher node 102 distributes the event data or the naming data to a content server 122 via the network 116. The content server 122 is described below in more detail.

In one embodiment, the publisher node 102 acts as one or more of a road side node 106, a relay node 114 and a consumer node 112. For example, the publisher node 102 provides the functionality of one or more of a road side node 106, a relay node 114 and a consumer node 112.

In the illustrated embodiment, the publisher node 102 includes a naming application 104a, a user interface device 108a, a navigation application 118a and a collecting device 120a. The components of the publisher node 102 are communicatively coupled to each other. In FIG. 1 and the remaining figures, a letter after a reference number, e.g., "104a," represents a reference to the element having that particular reference number. A reference number in the text without a following letter, e.g., "104," represents a general reference to instances of the element bearing that reference number.

The naming application 104a is code and routines for publishing and/or disseminating data in a mobile node network. In one embodiment, the naming application 104a detects road events occurred on a road and collects event data describing the road events. The naming application 104a converts the event data into naming data and publishes the naming data to nodes in a mobile node network. In another embodiment, the naming application 104a receives event data (or, naming data converted from the event data) from a node in a mobile node network and stores the event data (or, naming data) in a storage device (not pictured). The naming application 104a forwards the received data to other nodes in the mobile node network.

In one embodiment, the naming application 104a generates an interest request and sends the interest request to other nodes in a mobile node network. An interest is data specifying a type of content in which a node is interested. For example, an interest includes one or more of a location, a context, a time and/or a vehicle in which a node is interested. An interest request is an inquiry requesting data that matches an interest. For example, an interest request is an inquiry requesting an estimated trip time from Mountain View, Calif. to San Francisco, Calif. Further examples of an interest request include, but are not limited to, a request for traffic information at a particular location, a request for weather information at a location, a request for a driving speed in rush hours at a specific location, etc. In one embodiment, an interest request optionally includes one or more rules for determining reply data. For example, an interest request includes a rule to determine reply data when more than one set of naming data are found to be matched the interest request.

In one embodiment, the naming application 104a receives an interest request from a node in a mobile node network and determines whether there is any event data (or, naming data) stored in a storage device (not pictured) matching the interest request. If a match is found, the naming application 104a retrieves reply data matching the interest request from the storage device. Reply data is data matching an interest request. For example, reply data is naming data and/or event data associated with a road event that includes answers to an interest request. The naming application 104a sends the reply data to one or more of a consumer node 112 that generates the interest request and/or a relay node 114 that forwards the interest request to the consumer node 112. However, if no match is found, the naming application 104a forwards the interest request to other nodes in the mobile node network. For example, the naming application 104a forwards the interest request to a relay node 114.

In one embodiment, the naming application 104a comprised within a node proactively sends interest requests to other neighbor nodes to request for naming data and stores the received naming data in a storage device. For example, the naming application 104a predicts content in which other nodes might be interested in future and proactively retrieves the content from the mobile node network. The naming application 104a is described below in more detail with reference to FIGS. 2-9.

The user interface device 108a is a device for interacting with a user 110a. For example, the user interface device 108a is a computing device that includes a memory and a processor, for example, a head unit embedded in a vehicle, a cell phone (e.g., a smart phone), a tablet computer, a laptop computer, a personal digital assistant (PDA), a television with one or more processors embedded therein or coupled thereto and/or any other device capable of providing information to a user 110a. The user 110a interacts with the user interface device 108a via signal line 105.

In one embodiment, the user interface device 108a receives data from one or more of the naming application 104a and the navigation application 118a, and provides the received data to the user 110a. For example, the user interface device 108a receives reply data matching an interest request and presents the reply data to the user 110a via a display device connected to or included in the user interface device 108a. In another embodiment, the user interface device 108a receives input data (e.g., data describing an interest) from the user 110a and sends the input data to the naming application 104a.

The navigation application 118a is code and routines for providing navigational instructions. For example, the navigation application 118a is a navigation system such as a global positioning system (GPS). In one embodiment, the navigation application 118a determines a location of a node and generates a timestamp describing a current time in the location. The navigation application 118a sends the location and the timestamp to the naming application 104a.

The collecting device 120a is a device for collecting data. For example, the collecting device 120a includes one or more of a sensor, a camera and/or any other conventional data collecting device. In one embodiment, the collecting device 120a collects sensor data as described below (e.g., velocity data, location data, timestamp data, traffic data, image data and safety data describing a status of a safety system, etc.) and sends the collected sensor data to the naming application 104a.

In one embodiment, the collecting device 120a includes one or more sensors for measuring one or more of a time, a location of a vehicle (e.g., a latitude, longitude and altitude of the location), a distance from the vehicle to other objects (e.g., roadside structure, traffic lights, etc.), a distance from the vehicle to nearby vehicles, an acceleration of the vehicle, a velocity of the vehicle, a direction of travel, a fuel tank level, a battery charge level, and/or any other physical parameters in a surrounding environment of a vehicle such as temperature, humidity, etc.

In another embodiment, the collecting device 120a includes a camera sensor for recording images. For example, the collection device 120a includes a camera that records images of roads, traffic lights, other vehicles and/or objects (e.g., roadside structure), pedestrians crossing the road and environments surrounding a vehicle, etc. In yet another embodiment, the collecting device 120a includes one or more sensors for monitoring a safety system included in a vehicle such as an airbag system and an anti-lock braking system, etc.

The relay node 114 is an entity that disseminates data in a mobile node network. For example, the relay node 114 collects data from other nodes and provides the data to any entity upon request. In another example, the relay node 114 is a vehicle or a road side node 106 that collects event data and/or naming data from a publisher node 102 and/or other relay nodes 114 and forwards the event data and/or naming data to other nodes in a mobile node network.

In one embodiment, the relay node 114 receives event data and/or naming data from a publisher node 102 and caches the event data and/or naming data in a storage device (not pictured) associated with the relay node 114. The relay node 114 also forwards the event data and/or naming data to other nodes such as any other relay node 114 in the mobile node network. In another embodiment, the relay node 114 receives an interest request from a consumer node 112. The relay node 114 determines whether reply data matching the interest request is found. If reply data is found, the relay node 114 sends the reply data to the consumer node 112. If no reply data is found, the relay node 114 forwards the interest request to other nodes such as any other relay node 114 in the mobile node network. In one embodiment, the relay node 114 acts as one of a road side node 106, a publisher node 102 and a consumer node 112.

In the illustrated embodiment, the relay node 114 includes a naming application 104b, a user interface device 108b, a navigation application 118b and a collecting device 120b. A user 110b interacts with the user interface device 108b via signal line 115. The naming application 104b, the user interface device 108b, the navigation application 118b and the collecting device 120b have similar structures and provide similar functionality as the naming application 104a, the user interface device 108a, the navigation application 118a and the collecting device 120a, respectively. The descriptions will not be repeated here.

The consumer node 112 is an entity that requests data from other nodes in a mobile node network. For example, the consumer node 112 is a vehicle that sends an interest request to one or more of a publisher node 102, a relay node 114 and a road side node 106. The consumer node 112 receives reply data matching the interest request from the one or more of the publisher node 102, the relay node 114 and the road side node 106. In one embodiment, the consumer node 112 acts as one or more of a road side node 106, a publisher node 102 and a relay node 114. In one embodiment, the consumer node 112 generates an interest request and performs one or more of local search and global search to obtain reply data matching the interest request. The local search and the global search are described below in more detail with reference to FIGS. 2, 8A and 8B.

In the illustrated embodiment, the consumer node 112 includes a naming application 104c, a user interface device 108c, a navigation application 118c and a collection device 120c. A user 110c interacts with the user interface device 108c via signal line 119. The naming application 104c, the user interface device 108c, the navigation application 118c and the collecting device 120c have similar structures and provide similar functionality as the naming application 104a, the user interface device 108a, the navigation application 118a and the collecting device 120a, respectively. The descriptions will not be repeated here.

The road side node 106 is a node installed on a road side. For example, the road side node 106 is a static station deployed along a road for safety purposes such as collision avoidance and adaptive cruise control, etc. In one embodiment, the road side node 106 acts as one or more of a publisher node 102, a relay node 114 and a consumer node 112. In the illustrated embodiment, the road side node 106 includes a naming application 104d and a collecting device 120d. Optionally, the road side node 106 also includes a user interface device 108 and a navigation application 118. The naming application 104d and the collecting device 120d have similar structures and provide similar functionality as the naming application 104a and the collecting device 120a, respectively. The descriptions will not be repeated here.

The network 116 is a conventional type, wired or wireless, and may have numerous different configurations including a star configuration, token ring configuration or other configurations. Furthermore, the network 116 may include a local area network (LAN), a wide area network (WAN) (e.g., the Internet), and/or other interconnected data paths across which multiple devices may communicate. In some embodiments, the network 116 may be a peer-to-peer network. The network 116 may also be coupled to or includes portions of a telecommunications network for sending data in a variety of different communication protocols. In some embodiments, the network 116 includes Bluetooth communication networks or a cellular communications network for sending and receiving data including via short messaging service (SMS), multimedia messaging service (MMS), hypertext transfer protocol (HTTP), direct data connection, WAP, email, etc. In one embodiment, the network 116 is a wireless network using a connection such as DSRC, WAVE, 802.11p, a 3G network, a 4G network, WiFi, or any other wireless networks.

Optionally, the system 100 includes a content server 122. The content server 122 is a hardware server that includes a processor, a memory and network communication capabilities. The content sever 122 is communicatively coupled to the network 116 via signal line 123. The content server 122 sends and receives data to and from other entities of the system 100 via the network 116. While FIG. 1 includes one content server 122, the system 100 may include one or more content servers 122. In one embodiment, the content server 122 receives naming data from one or more of a publisher node 102, a relay node 114, a road side node 106 and a consumer node 112 and stores the naming data in a storage device (not pictured). In another embodiment, the content server 122 receives an interest request from a node via the network 116 and determines reply data matching the interest request from a storage device (not pictured) associated with the content server 122. The content server 122 sends the reply data to the node.

Naming Application

Figure 2:
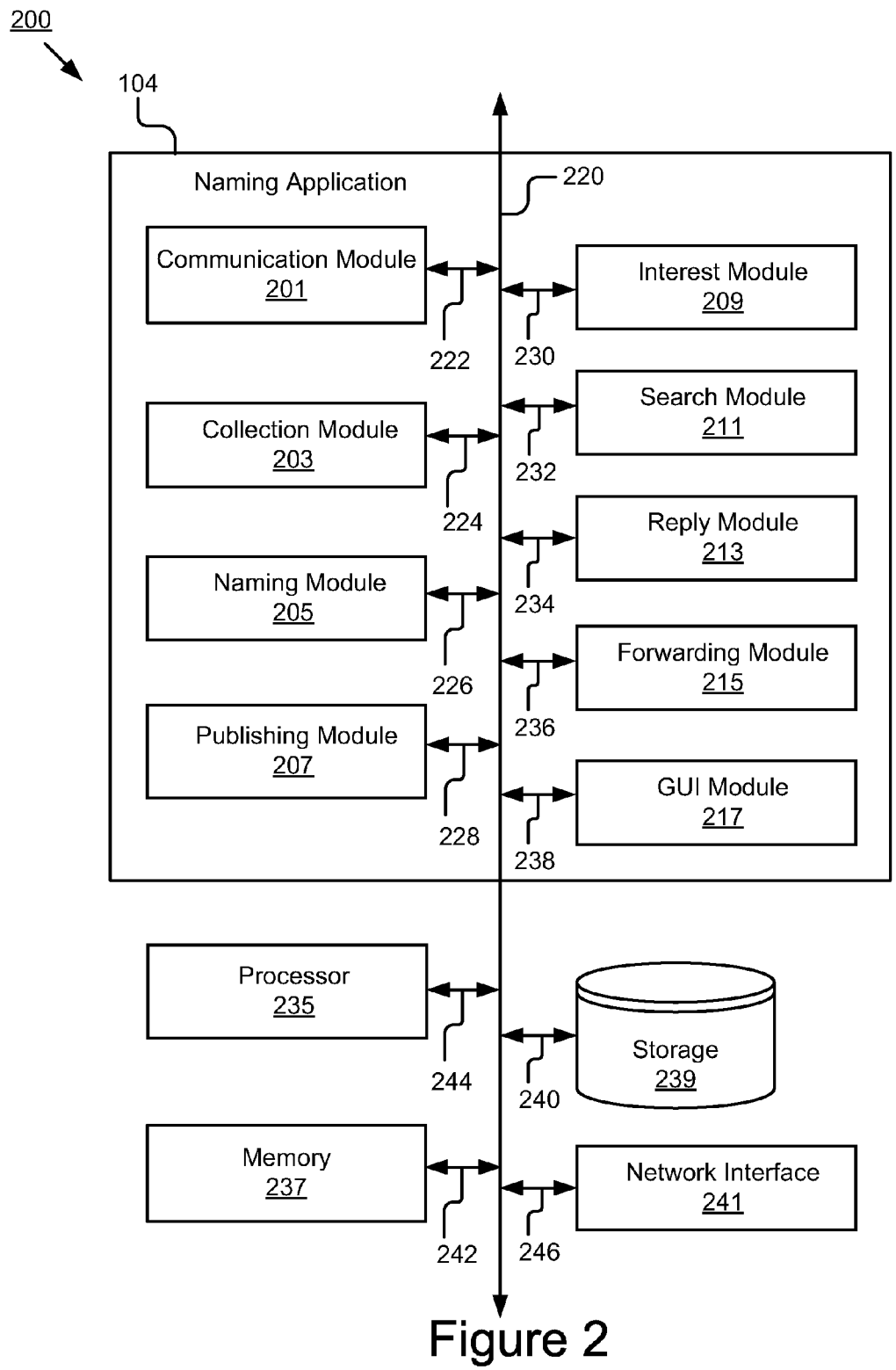
FIG. 2 is a block diagram illustrating a naming application according to one embodiment.

Referring to FIG. 2, an example of the naming application 104 is shown in more detail. FIG. 2 is a block diagram illustrating a computing device 200 that includes a naming application 104, a processor 235, a memory 237, a storage 239 and a network interface 241 according to some embodiments. In one embodiment, the computing device 200 is comprised within one or more of a publisher node 102, a relay node 114, a road side node 106 and a consumer node 112.

The components of the computing device 200 are communicatively coupled to each other via a bus 220. For example, the processor 235 is communicatively coupled to the bus 220 via signal line 244. The memory 237 is communicatively coupled to the bus 220 via signal line 242. The storage 239 is communicatively coupled to the bus 220 via signal line 240. The network interface 241 is communicatively coupled to the bus 220 via signal line 246.

The processor 235 comprises an arithmetic logic unit, a microprocessor, a general purpose controller or some other processor array to perform computations, retrieve data stored on the storage 239, etc. The processor 235 processes data signals and may comprise various computing architectures including a complex instruction set computer (CISC) architecture, a reduced instruction set computer (RISC) architecture, or an architecture implementing a combination of instruction sets. Although only a single processor 235 is shown in FIG. 2, multiple processors 235 may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 237 stores instructions and/or data that may be executed by the processor 235. The instructions and/or data may comprise code for performing any and/or all of the techniques described herein. The memory 237 may be a dynamic random access memory (DRAM) device, a static random access memory (SRAM) device, flash memory or some other memory device known in the art. In one embodiment, the memory 237 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The storage 239 is a non-transitory memory that stores data. For example, the storage 239 is a dynamic random access memory (DRAM) device, a static random access memory (SRAM) device, flash memory or some other memory device known in the art. In one embodiment, the storage 239 also includes a non-volatile memory or similar permanent storage device and media such as a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device known in the art.

In one embodiment, the storage 239 includes a forwarding table, an interest table and a content cache. The storage 239 may also store other data for providing the functionality described herein.

The forwarding table is a table for forwarding naming data. For example, the forwarding table includes identifiers (IDs) of one or more nodes to which the naming application 104 forwards naming data (e.g., node IDs identifying one or more of publisher nodes 102, relay nodes 114, road side nodes 106 and consumer nodes 112, etc., for data forwarding). In another example, the forwarding table includes node IDs identifying nodes to which the naming application 104 forwards interest requests. The forwarding table may include any other data for providing the functionality described herein.

The interest table is a table that stores interests. For example, the interest table stores one or more pending interests received from an administrator of the computing device 200. A pending interest is an interest for which no matching reply data has been received. For example, a pending interest indicates that a user wants to know the traffic condition on a highway from section 400 to section 450. In one embodiment, the naming application 104 deletes the pending interest from the interest table after receiving reply data that matches the pending interest.

The content cache stores one or more of: data collected from the collecting device 120; and data received from other nodes. In one embodiment, the content cache stores sensor data (including image data and safety data) collected from one or more sensors. In another embodiment, the content cache stores event data describing one or more road events detected by the naming application 104. In yet another embodiment, the content cache stores naming data generated by the naming application 104 and/or received from other nodes in the system 100.

The network interface 241 is an interface for connecting the computing device 200 to one or more of a network 116 and other nodes in a mobile node network. For example, the network interface 241 is a network adapter that connects the computing device 200 to the network 116. In another example, the network interface 241 is a device connecting the computing device 200 comprised within a first node to other nodes in a V2V communication scenario, a V2R communication scenario and/or a vehicle-to-infrastructure (V2I) communication scenario.

In one embodiment, the network interface 241 transmits and receives data to and from one or more of the content server 122, the publisher node 102, the relay node 114, the consumer node 112 or the road side node 106 depending upon where the naming application 104 is comprised within. In one embodiment, the network interface 241 includes a port for direct physical connection to the network 116 or to another communication channel. For example, the network interface 241 includes a universal serial bus (USB), category 5 cable (CAT-5) or similar port for wired communication with the network 116. In another embodiment, the network interface 241 includes a wireless transceiver for exchanging data with the network 116, or with another communication channel, using one or more wireless communication methods, such as IEEE 802.11, IEEE 802.16, BLUETOOTH®, near field communication (NFC), DSRC, WAVE, 802.11p or another suitable wireless communication method. In one embodiment, the network interface 241 includes a NFC chip that generates a radio frequency (RF) for short-range communication.

In some embodiments, the network interface 241 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some embodiments, the network interface 241 also provides other conventional connections to the network 116 for distribution of files and/or media objects using standard network protocols including TCP/IP, HTTP, HTTPS and SMTP, etc.

In the illustrated embodiment, the naming application 104 includes a communication module 201, a collection module 203, a naming module 205, a publishing module 207, an interest module 209, a search module 211, a reply module 213, a forwarding module 215 and a graphical user interface (GUI) module 217. The components of the naming application 104 are communicatively coupled to each other via the bus 220.

The communication module 201 is code and routines that, when executed by the processor 235, handles communications between components of the naming application 104 and other components of the system 100. For example, the communication module 201 comprised within a node receives, via the network interface 241, data from other nodes of the system 100 and sends the received data to components of the naming application 104 (e.g., the collection module 203, the naming module 205, etc.). In another example, the communication module 201 comprised within a node receives data from other components of the same node (e.g., the navigation application 118, the collecting device 120 and the user interface module 108, etc., in the same node) and sends the received data to other components of the naming application 104. The communication module 201 is communicatively coupled to the bus 220 via signal line 222.

In one embodiment, the communication module 201 also handles communications among the components of the naming application 104. For example, the communication module 201 receives one or more interest requests from the interest module 209 and sends the one or more interest requests to the search module 211. The interest module 209 is described below in more detail.

In one embodiment, the communication module 201 retrieves data (e.g., an interest from the interest table, a node ID from the forwarding table, etc.) from the storage 239 and sends the retrieved data to components of the naming application 104 (e.g., the interest module 209, the forwarding module 215, etc.). In another embodiment, the communication module 201 receives data (e.g., naming data) from components of the naming application 104 (e.g., the naming module 205) and stores the data in the storage 239. One skilled in the art will recognize that the communication module 201 may provide other functionality described herein.

The collection module 203 is code and routines that, when executed by the processor 235, detects road events and collects event data describing the road events. The collection module 203 is communicatively coupled to the bus 220 via signal line 224. In one embodiment, the collection module 203 collects sensor data (e.g., environmental data describing an environment surrounding a node, vehicle data such as velocity data associated with a vehicle, etc.) using the collection device 120 and/or the navigation application 118. In one embodiment, the collection module 203 periodically collects the sensor data from one or more sensors. In another embodiment, the collection module 203 collects the sensor data in an event-driven approach. For example, if a vehicle suddenly stops on a highway, the collection module 203 comprised within the vehicle is triggered to collect sensor data responsive to the sudden stop.

The collection module 203 detects a road event based at least in part on the collected sensor data. For example, the collection module 203 receives velocity data from one or more sensors and determines an occurrence of a road event such as increased traffic by detecting a velocity decrement over time. In another example, the collection module 203 collects image data from a camera sensor and detects a collision on a road by processing the image data. In yet another example, the collection module 203 receives a signal from a sensor monitoring a safety system. The signal indicates a deployment of airbags in a vehicle. The collection module 203 detects an occurrence of a road event such as a collision based on the received signal.

The collection module 203 generates event data describing the road event responsive to detecting the occurrence of the road event. For example, the collection module 203 generates event data including one or more of: a location where the road event occurs; a timestamp when the road event occurs; and an event category for the road event. Examples of an event category include, but are not limited to: traffic; accident (e.g., collision); weather; road closure; road construction; and speed, etc.

In one embodiment, the collection module 203 comprised within a first node receives an interest request from a second node (e.g., a consumer node 112) and determines whether the interest request is related to a driving route, a destination and/or a driving direction of the first node. If the interest request is related to the driving route, the destination or the driving direction of the first node, the collection module 203 collects event data requested by the interest request. For example, the collection module 203 comprised within a vehicle receives an interest request from a road side node 106 (e.g., a traffic light node). The interest request inquires a trip time for a route from a first location to a second location. The collection module 203 determines whether the route is part of the driving route for the vehicle. If the route is part of the driving route for the vehicle, the collection module 203 collects the trip time when the vehicle drives from the first location to the second location. However, if the route is not part of the driving route for the vehicle, the collection module 203 ignores the interest request. In one embodiment, the collection module 203 sends the interest request to the forwarding module 215, causing the forwarding module 215 to forward the interest request to other vehicle nodes.

In one embodiment, the collection module 203 stores the event data in the storage 239. In another embodiment, the collection module 203 sends the event data to the naming module 205.

The naming module 205 is code and routines that, when executed by the processor 235, converts event data to naming data and vice versa based at least in part on a naming structure. The naming module 205 is communicatively coupled to the bus 220 via signal line 226. In one embodiment, the naming module 205 receives event data from the collection module 203 and converts the event data to naming data according to a naming structure. Naming data is data compatible with named data networking techniques. For example, the naming data is a data packet that includes data converted from event data. In another example, the naming data is an interest packet describing content requested by a consumer node 112. In one embodiment, the naming data (e.g., the data packet and/or the interest packet) are disseminated over a mobile node network using named data networking techniques.

In one embodiment, the naming data conforms to a naming structure. A naming structure is a structure to organize naming data. In one embodiment, the naming structure includes one or more of: an application identifier (ID) identifying an application for a road event; a location; a timestamp; a data type for the road event; and a name ID that uniquely identifies the naming data. In one embodiment, the design of naming structures is application dependent and different applications may use different naming structures.

An application ID in a naming structure uniquely identifies a current application that the naming structure is applied to. For example, an application ID "traffic" identifies that the naming structure is applied to an application related to traffic such as velocities, congestion, etc. In another example, an application ID "safety" identifies that the naming structure is applied to an application related to safety conditions such as collisions, accidents, etc.

A location in a naming structure uniquely identifies a geographical scope for the road event. For example, a location in a naming structure identifies a geographical scope where a road event described by the naming data applies. In a further example, a location in a naming structure indicates a section of a road where an accident occurs. In one embodiment, the location includes a road ID that uniquely identifies the road, a direction of traffic relating to the road event (e.g., east bound, north bound, etc.) and one or more section IDs identifying one or more sections of the road being described. For example, a location in a format of "road ID/direction/section IDs" such as "Highway 101/north/{section 400, section 410}" identifies a geographical scope for north bound Highway 101 between section 400 and section 410. In one embodiment, a section ID identifies an exit for a highway. In another embodiment, a section ID identifies a mile marker along a highway.

In one embodiment, the location in the naming structure also includes a link ID that is used by a navigation system (e.g., a GPS) to uniquely identify a road segment. A combination of a road ID and a link ID uniquely identifies a local road segment. In another embodiment, the location in the naming structure includes a combination of a road ID, one or more latitude values and one or more longitude values to identify a geographical scope.

A timestamp in a naming structure identifies a temporal scope of a road event. For example, the timestamp describes the time when a road event occurs (e.g., Tuesday, Dec. 6, 2011, 12:00:00). In another example, the timestamp indicates a period of time during which the naming data is valid. For example, a timestamp indicates that a road event described by the naming data is valid from 12:00:00 to 13:00:00 Tuesday, Dec. 6, 2011. In yet another example, the timestamp indicates an expiration time for the naming data. For example, a timestamp indicates that a road event described by the naming data is expired after 13:00:00 Tuesday, Dec. 6, 2011. In one embodiment, the timestamp for the naming data is organized in a specified form such as a UNIX timestamp. For example, a timestamp "Tuesday, Dec. 6, 2011, 12:00:00-13:00:00" is described as {1323201600, 1323205200}. Other formats for recording the timestamps are possible.

A data type is data describing a category for a road event described in the naming data. For example, a data type includes one of a lane closure, an average vehicle velocity and/or a trip time to destination, etc.

A name ID is an identifier that uniquely identifies the naming data. In one embodiment, the name ID is a random number generated by a publisher node 102 that generates the naming data. For example, a name ID is a random number having 8 digits such as "19375887." In one embodiment, one or more publisher nodes 102 simultaneously detect the same road event at the same location, and each of the publisher nodes 102 generates a set of naming data accordingly. Each of the publisher nodes 102 generates a different name ID for the corresponding set of naming data.

In one embodiment, a naming structure is organized in a format of "application ID/location/timestamp/data type/name ID." An example of naming data that conforms to a naming structure is "/traffic/Highway 101/north/{400, 410}/{1323201600,1323205200}/speed/19375887}. This example indicates that the illustrated naming data: (1) is applied to traffic-related applications (e.g., "traffic"); (2) has a geographical scope between section 400 and section 410 on Highway 101 north bound (e.g., "Highway 101/north/{400, 410}"); (3) has a temporal scope between 12:00:00 and 13:00:00 on Dec. 6, 2011 (e.g., "{1323201600,1323205200}"); (4) has a data type of an average speed (e.g., "speed"); and (4) has a name ID "19375887" uniquely identifying the naming data.

In one embodiment, the design of the naming structure satisfies requirements for: duplication detection and elimination; and data accuracy. For example, a name ID included in a set of naming data uniquely identifies the naming data and is used for duplication detection and elimination. In another example, one or more sets of naming data describing a common road event are published by one or more publisher nodes 102. Data accuracy for the road event is improved if the one or more sets of naming data are considered simultaneously. For example, an average speed is determined based on speed data included in the one or more sets of naming data.

In one embodiment, a set of naming data conforming to a naming structure is organized in a data packet. The naming module 205 sends the naming data (e.g., a data packet including the naming data) to the publishing module 207, causing the publishing module 207 to publish the naming data in a mobile node network. In another embodiment, the naming module 205 stores the naming data in the storage 239.

In one embodiment, the naming module 205 comprised within a first node receives naming data from one or more other nodes such as a publisher node 102, a relay node 114 and/or a road side node 106 via the communication module 201 and the network interface 241. The naming module 205 transforms the received naming data to event data based at least in part on a naming structure. The naming module 205 sends the event data to the GUI module 217, causing the GUI module 217 to generate graphical data for presenting a road event described by the event data to a user via a user interface.

The publishing module 207 is code and routines that, when executed by the processor 235, publishes naming data in a mobile node network. In one embodiment, the publishing module 207 distributes naming data and/or event data to one or more of a road side node 106, a consumer node 112 and/or a relay node 114. In another embodiment, the publishing module 207 distributes sensor data collected by the collection module 203 to one or more of a road side node 106, a consumer node 112 and/or a relay node 114. The publishing module 207 is communicatively coupled to bus 220 via signal line 228.

The interest module 209 is code and routines that, when executed by the processor 235, generates an interest request. The interest module 209 is communicatively coupled to the bus 220 via signal line 230. In one embodiment, the interest module 209 retrieves an interest from the storage 239 and generates an interest request based at least in part on the interest. For example, the interest module 209 queries the interest table for a pending interest and generates an interest request including the pending interest. In another embodiment, the interest module 209 receives one or more interests from a user and generates one or more interest requests corresponding to the one or more received interests. For example, the user inputs a new interest via the user interface device 108 to the interest module 209, causing the interest module 209 to generate an interest request for the user.

In one embodiment, the interest module 209 retrieves data describing a driving history of a user from the storage 239 and determines an interest for the user based at least in part on the driving history. The interest module 209 generates an interest request including the determined interest. For example, a driving history indicates that the user takes a daily route from home to work at about 8:00 AM. The interest module 209 automatically determines an interest for the user as traffic conditions for the daily route from home to work at 8:00 AM, and generates an interest request for the user to request traffic conditions for the daily route from home to work at 8:00 AM.

In one embodiment, the interest request generated by the interest module 209 is a set of naming data conforming to at least part of a naming structure. An example of an interest request is "/traffic/Highway 101/north/{400, 410}/{1323201600, 1323205200}/speed/." This interest request indicates a request for speed data within a geographical scope between section 400 and section 410 on Highway 101 north bound (e.g., "Highway 101/north/{400, 410}") and within a temporal scope between 12:00:00 and 13:00:00 on Dec. 6, 2011 (e.g., "{1323201600,1323205200}"). In another example, an interest request is "/traffic/Highway 101/north/{400,410}/." No temporal scope and no data type are specified in this interest request. This example interest request inquires for all traffic data (e.g., speed, congestion, road accident, etc.) from the specified location (e.g., "/Highway 101/north/{400,410}/") regardless of the temporal scope and the data type. In yet another example, an interest request is "/traffic/Highway 101." No traffic direction, no section IDs, no temporal scope and no data type are specified in this interest request. This interest request inquires for all traffic data on highway 101 regardless of the section regions, the traffic direction, the temporal scope and the data type.

In one embodiment, the interest module 209 sends the interest request to the reply module 213, causing the reply module 213 to determine whether reply data matching an interest included in the interest request is found in the storage 239. If no reply data is found, the interest module 209 sends the interest request to the search module 211. However, if reply data is found, the interest module 209 deletes the interest request and instructs the reply module 213 to present the reply data to a user. For example, the interest module 209 deletes the pending interest corresponding to the interest request from the interest table.

The search module 211 is code and routines that, when executed by the processor 235, searches for event data and/or naming data matching one or more interest requests. In one embodiment, the search module 211 performs one of a local search and a global search for an interest request as described below. The search module 211 is communicatively coupled to the bus 220 via signal line 232.

A global search is a search performed via a content server 122. For example, the search module 211 sends an interest request to the content server 122 via the network 116, causing the content server 122 to search for reply data matching the interest request. For example, the content server 122 searches a storage device (not pictured) associated with the server for any reply data matching the interest request. If reply data is found, the content server 122 sends the reply data to one or more of the search module 211 and/or the reply module 213.

A local search is a search performed in a mobile node network. For example, the search module 211 comprised within a first node delivers an interest request to a neighbor node and requests the neighbor node to search for reply data matching the interest request from a storage device associated with the neighbor node. If the neighbor node has reply data matching the interest request, the neighbor node sends the reply data to one or more of the search module 211 and/or the reply module 213 comprised within the first node. If the neighbor node does not have reply data matching the interest request, the neighbor node forwards the interest request to other nodes in the mobile node network, causing the other nodes to perform search for reply data from storage devices associated with the other nodes.

In one embodiment, the search module 211 receives an interest request from the interest module 209 and determines whether to perform a local search or a global search for the interest request. For example, the search module 211 determines whether the interest request is location specific and/or whether the interest request requires a real-time search. If the interest request is location specific (e.g., the interest request inquiring for data related to a specific location) and/or the interest request requires a real-time search (e.g., the interest request inquiring for real-time data), the search module 211 performs a local search for the interest request in the mobile node network. If no reply data matching the interest request is found in the local search, or if there is no need for location specific or real-time search, the search module 211 performs a global search via the content server 122.

In one embodiment, the search module 211 comprised within a node receives reply data from one or more other nodes via a local search. In another embodiment, the search module 211 receives reply data from the content server 122 via a global search. The search module 211 sends the reply data to the reply module 213.

The reply module 213 is code and routine that, when executed by the processor 235, processes and/or replies to interest requests. The reply module 213 is communicatively coupled to bus 220 via signal line 234. In one embodiment, the reply module 213 comprised within a first node receives one or more interest requests from other nodes, and searches event data or naming data stored in the content cache of the storage 239 to determine reply data matching the one or more interest requests. For example, the reply module 213 receives an interest request from a node and determines whether reply data matching the interest request is found in the storage 239.

If reply data is found, the reply module 213 retrieves the reply data (e.g., event data or naming data matching the interest) from the storage 239, optionally aggregates the reply data as described below, and sends the reply data to the node via the forwarding module 215. If reply data matching the interest request is not found in the storage 239, the reply module 213 sends the interest request to the forwarding module 215, causing the forwarding module 215 to forward the interest request to other nodes for further search for the reply data.

In one embodiment, the reply module 213 aggregates the reply data matching the interest request into a reply packet. A reply packet is a data packet including one or more sets of naming data. For example, assume the reply data includes multiple sets of naming data matching the interest request. The reply module 213 aggregates the multiple sets of naming data into a reply packet and sends the reply packet to a consumer node 112 that sends the interest request. In one embodiment, the reply packet also includes a signature (e.g., a digital signature) of the reply data.

In one embodiment, the reply module 213 randomly selects one or more sets of naming data from the multiple sets of naming data, and forms a reply packet including the randomly selected sets of naming data. In another embodiment, the reply module 213 aggregates the multiple sets of naming data into a reply packet based at least in part on a rule included in the interest request. For example, if the rule indicates to return two sets of naming data with latest publication times, the reply module 213 generates a reply packet including the two sets of naming data having the latest publication times.

In yet another embodiment, the reply module 213 generates a reply packet including a reference (e.g., a name ID) to each of the multiple sets of naming data, and sends the reply packet to the consumer node 112. After receiving the reply packet, the consumer node 112 retrieves the multiple sets of naming data from the mobile node network using the references (e.g., name IDs). For example, the consumer node 112 sends a request including a name ID to a relay node 114, causing the relay node 114 to retrieve naming data identified by the name ID from a storage device and send the naming data to the consumer node 112.

In one embodiment, the reply module 213 comprised within a node receives an interest request generated by the interest module 209 comprised within the same node. The reply module 213 determines whether reply data for the interest request is found in the storage 239 comprised within the same node. If matching reply data is found, the reply module 213 retrieves the reply data from the storage 239 and sends the reply data to the GUI module 217, causing the GUI module 217 to present the reply data to a user via the user interface device 108. If no reply data is found in the storage 239 associated with the same node, the reply module 213 instructs the forwarding module 215 to forward the interest request to other nodes.

In another embodiment, the reply module 213 comprised within a first node receives reply data (e.g., a reply packet) from other nodes. The reply data matches an interest request generated by the first node. The reply module 213 processes the reply data to generate a set of event data and provides the set of event data to a user related to the first node. For example, the reply module 213 concatenates the replay data into a set of event data and presents the set of event data to a user. In one embodiment, the reply module 213 processes the reply data to improve data accuracy. For example, the reply data includes one or more sets of naming data received from one or more other nodes. Each set of naming data describes a speed for the same section ID on the same road at 8 AM. The reply module 213 generates an average speed using the one or more sets of naming data and presents the average speed to a user who requests a traffic speed related to the section ID of the road at 8 AM.

In one embodiment, if the received reply packet includes one or more sets of naming data, the reply module 213 instructs the naming module 205 to convert the one or more sets of naming data to one or more sets of event data. In another embodiment, the received reply packet includes one or more references (e.g., name IDs) to one or more sets of naming data. The reply module 213 retrieves the one or more sets of naming data from the mobile node network using the references, and instructs the naming module 205 to convert the one or more sets of naming data to one or more sets of event data. In either embodiment, the reply module 213 processes the one or more sets of event data and sends the processed event data to the GUI module 217 for presentation to a user.

The forwarding module 215 is code and routine that, when executed by a processor 235, forwards data to other nodes in the mobile node network. In one embodiment, the forwarding module 215 receives naming data (e.g., a naming packet) from one or more of a publishing node 102, a road side node 106, a consumer node 112 and/or a relay node 114. A naming packet includes one or more sets of naming data conforming to a naming structure. For example, a naming packet is a data packet, a reply packet, or an interest request compatible with named data networking techniques. The forwarding module 215 is communicatively coupled to the bus 220 via signal line 236.

In one embodiment, the forwarding module 215 determines whether the received naming data is a duplicate set of naming data that is already stored in the storage 239. If the naming data is a duplicate set of naming data, the forwarding module 215 ignores the duplicate data. If the naming data has no duplicate in the storage 239, the forwarding module 215 stores the naming data in the content cache. In one embodiment, the forwarding module 215 also forwards the received naming data to one or more other nodes such as a publisher node 102, a road side node 106, a consumer node 112 and/or a relay node 114.

Figure 10A:
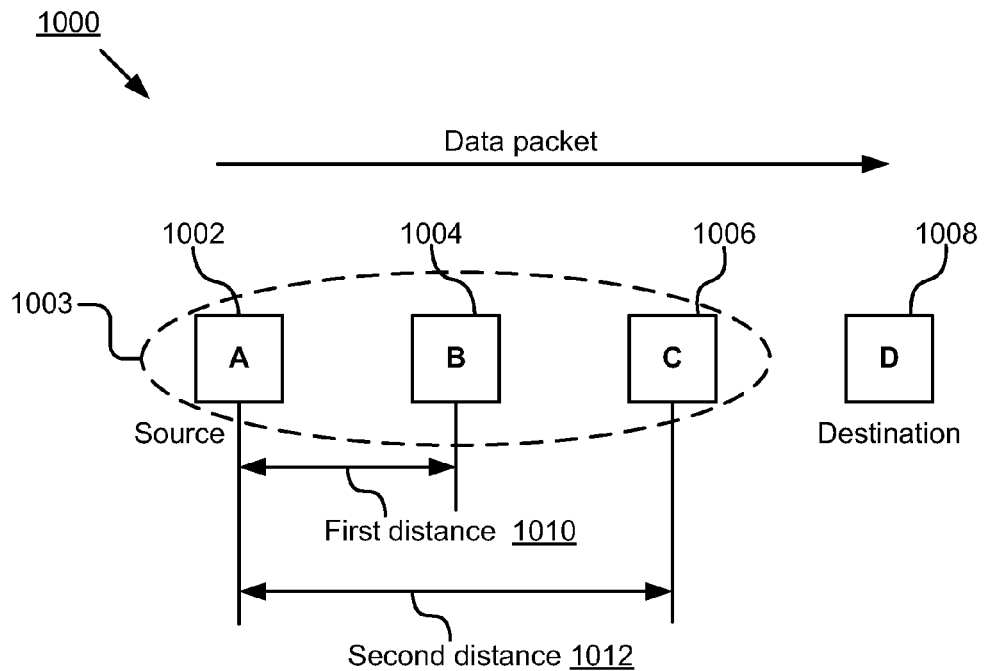
FIG. 10A is a graphic representation illustrating a process to forward a data packet according to one embodiment.
Figure 10B:
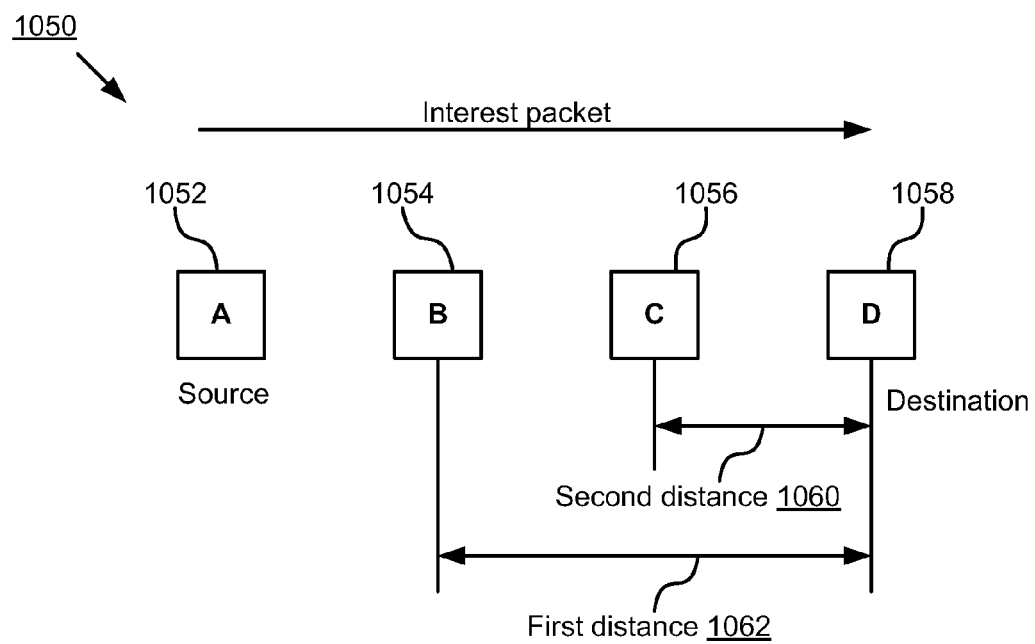
FIG. 10B is a graphic representation illustrating a process to forward an interest packet according to one embodiment.

In one embodiment, a source node disseminates a naming packet (e.g., a data packet or an interest packet) to a destination node. Each of the source node and the destination node is one of a publishing node 102, a road side node 106, a consumer node 112 and/or a relay node 114. The destination node is outside the transmission range of the source node. However, there are at least a first node and a second node that are within the transmission range of the source node and/or the transmission range of the destination node. Because of the broadcast characteristic on a V2V communication scenario, both the first node and the second node receive the naming data transmitted by the source node. However, either the first node or the second node needs to transmit the naming packet to the destination node but not both nodes need to transmit the naming packet in order to avoid transmission redundancy. Examples of this communication scenario are illustrated in FIGS. 10A and 10B.

In one embodiment, the forwarding module 215 comprised within the first node receives the naming packet via the communication module 201. For example, the forwarding module 215 overhears a transmission of the naming data from other nodes. The forwarding module 215 determines whether the naming packet is already scheduled for transmission at the first node. If the transmission of the naming packet is not scheduled, a schedule for transmission of the naming packet is made at the first node.

In one embodiment, the forwarding module 215 determines the content of the received naming packet. For example, the forwarding module 215 determines whether the naming packet is a data packet or an interest packet. In one embodiment, a data packet is naming data to be disseminated in a mobile node network and focuses on where the data packet is from. Therefore, a data packet includes location data describing a location of the source node (e.g., GPS coordinates of the source node). An interest packet is a packet related to an interest such as an interest request and/or a reply packet including reply data matching an interest. In one embodiment, an interest packet is one of: a reply packet to be delivered to a consumer node 112; and an interest request issued by a consumer node 112. An interest packet focuses on which node issues an interest inquiry and therefore includes location data describing a location of the destination node (e.g., GPS coordinates of the destination node).

If the received naming packet is a data packet including a location for the source node, the forwarding module 215 determines a first distance from the source node to the first node. The forwarding module 215 also determines a second distance between the source node and the second node. The forwarding module 215 comprised within the first node determines whether to forward the data packet to the destination node based at least in part on the first distance and the second distance. For example, if the first distance is less than the second distance, the forwarding module 215 comprised within the first node cancels the scheduled transmission of the data packet at the first node because the second node is further away from the source node than the first node. The second node forwards the data packet to the destination node. However, if the first distance is greater than the second distance which means the first node is further away from the source node than the second node, the forwarding module 215 maintains the scheduled transmission of the data packet at the first node and forwards the data packet to the destination node. An example of this forwarding strategy is illustrated in FIG. 10A.

If the received naming packet is an interest packet including a location for the destination node, the forwarding module 215 comprised within the first node determines a first distance from the destination node to the first node. The forwarding module 215 also determines a second distance between the destination node and the second node. The forwarding module 215 comprised within the first node determines whether to forward the data packet to the destination node based at least in part on the first distance and the second distance. For example, if the first distance is greater than the second distance, the forwarding module 215 cancels the scheduled transmission of the interest packet at the first node because the second node is closer to the destination node than the first node. The second node forwards the interest packet to the destination node. However, if the first distance is not greater than the second distance which means that the first node is closer to the destination node than the second node, the forwarding module 215 maintains the scheduled transmission at the first node and forwards the data packet to the destination node. An example of this forwarding strategy is illustrated in FIG. 10B.

The GUI module 217 is code and routines that, when executed by the processor 235, generates graphical data for providing user interfaces. In one embodiment, the GUI module 217 is adapted for communication and cooperation with the processor 235 and other components of the naming application 104 via signal line 238. In one embodiment, the GUI module 217 receives reply data that matches an interest in the interest table. The GUI module 217 generates graphical data for providing a user interface that notifies a user of the reply data matching the interest. For example, naming data regarding a lane closure is received by the reply module 213 and event data corresponding to the naming data is sent to the GUI module 217. The GUI module 217 generates graphical data that provides a user interface displaying the message "One lane is closed on Highway 101 between section 400 and section 410; the average speed is 23 mph." The GUI module 217 sends the graphical data to the user interface device 108, causing the user interface device 108 to display the message to the user.

In one embodiment, the GUI module 217 generates graphical data for providing a user interface to a user, allowing the user to input an interest via the user interface. The GUI module 217 may generate other graphical data for providing other user interfaces to a user.

Methods

Figure 3:
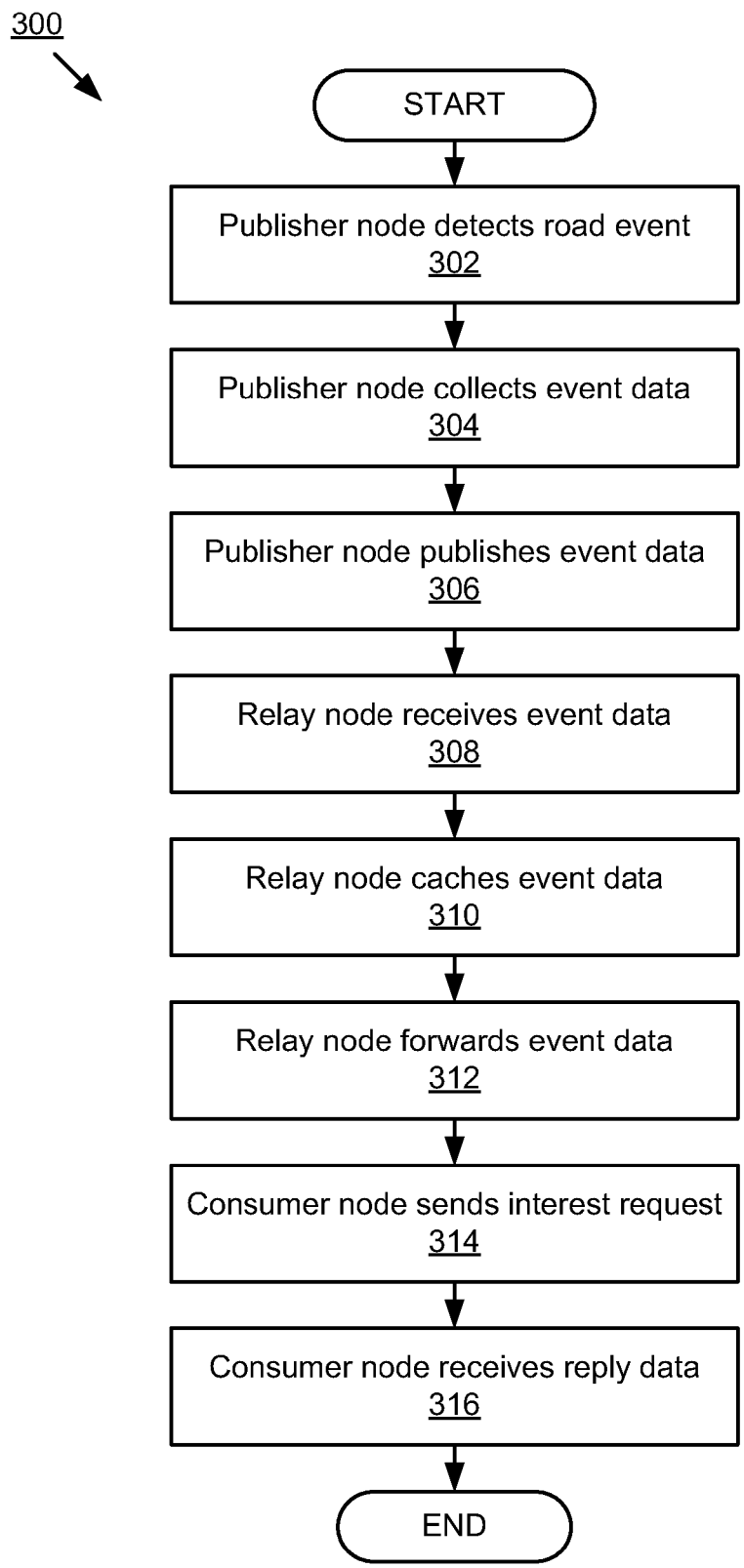
FIG. 3 is a flowchart illustrating a method for dynamic data publication and dissemination according to one embodiment.

Referring now to FIGS. 3-9, various embodiments of the method of the specification will be described. FIG. 3 is a flowchart illustrating a method 300 for dynamic data publication and dissemination according to one embodiment. The publisher node 102 detects 302 a road event. The publisher node 102 collects 304 the event data describing the road event using the collecting device 120. The publisher node 102 publishes 306 the event data. A first relay node 114 receives 308 the event data. The first relay node 114 caches 310 the event data in a storage 239. The first relay node 114 forwards 312 the event data to other nodes (e.g., a road side node 106, a consumer node 112, a second relay node 114, etc.). A consumer node 112 sends 314 an interest request to another node such as the publisher node 102 or the first relay node 114 requesting for the event data. The consumer node 112 receives 316 reply data including the event data from the other node.

Figure 4:
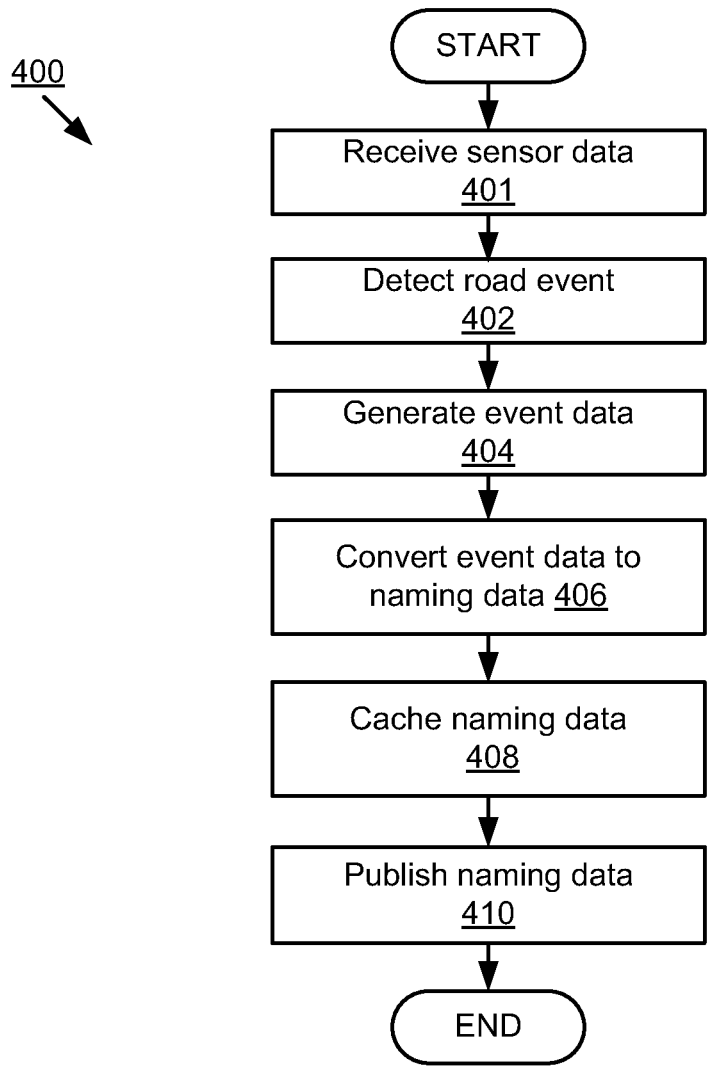
FIG. 4 is a flowchart illustrating a method for publishing naming data according to one embodiment.

FIG. 4 is a flowchart illustrating a method 400 for publishing naming data according to one embodiment. In one embodiment, the communication module 201 receives 401 sensor data from the collecting device 120. The collection module 203 receives the sensor data from the communication module 201 and detects 402 an occurrence of a road event based at least in part on the sensor data. The collection module 203 generates 404 event data describing the road event and sends the event data to the naming module 205. The naming module 205 converts 406 the event data to naming data based at least in part on a naming structure. The naming module 205 caches 408 the naming data in the storage 239. The naming module 205 sends the naming data to the publishing module 207. The publishing module 207 publishes 410 the naming data in a mobile node network. For example, the publishing module 410 distributes the naming data to other nodes in a mobile node network.

Figure 5:
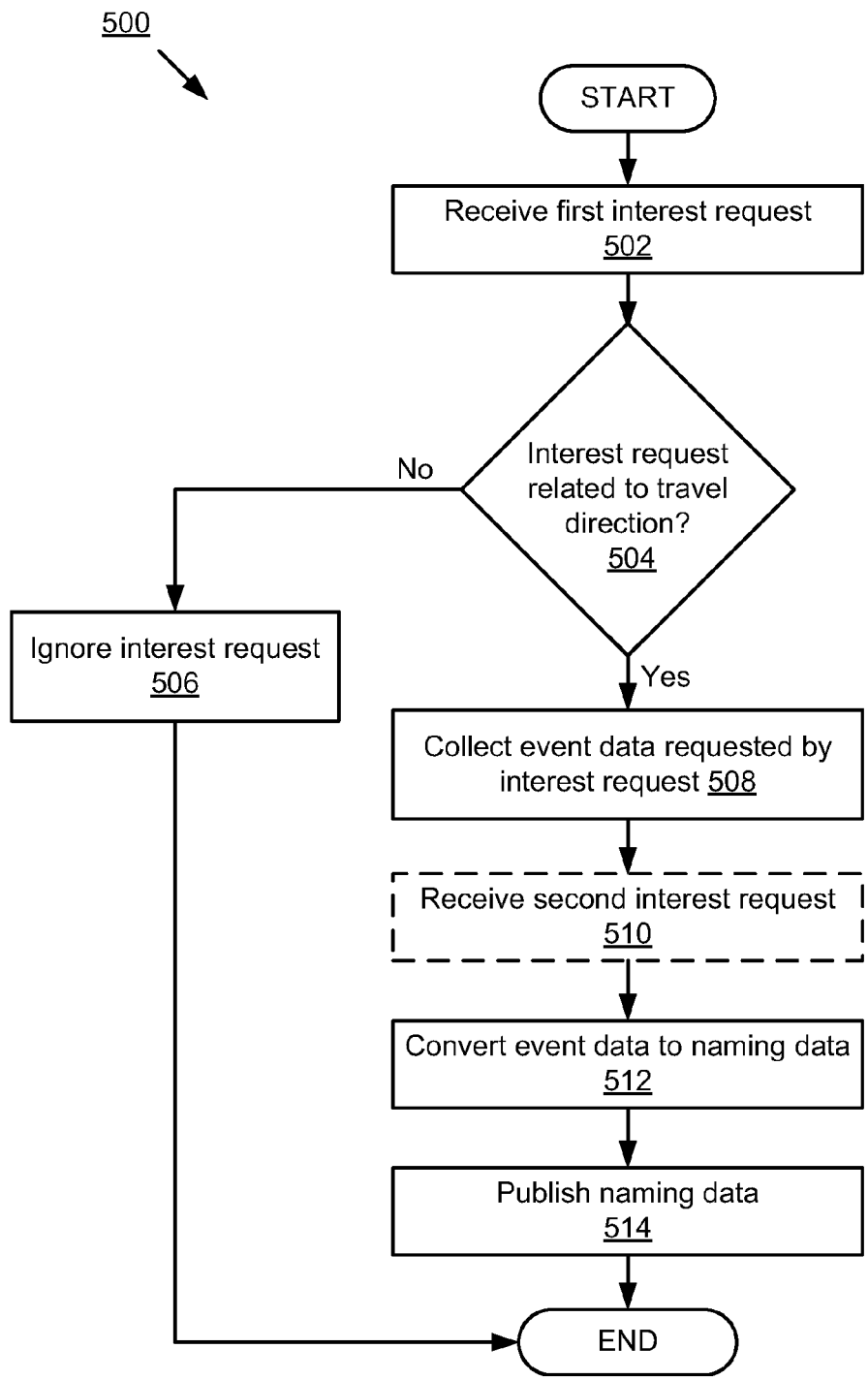
FIG. 5 is a flowchart illustrating a method for publishing naming data according to another embodiment.

FIG. 5 is a flowchart illustrating a method 500 for publishing naming data according to another embodiment. The communication module 201 comprised within a first node receives 502 a first interest request from a second node. For example, the interest request requests the first node to record a travel time from a start point to a destination. The collection module 203 determines 504 whether the interest request is related to a travel direction of the first node. For example, the collection module 203 determines whether the interest request inquires for content coinciding with the projected travel route, the direction or the destination of the first node. If the interest request is not related to the travel direction of the first node, the collection module 203 ignores 506 the interest request. Otherwise, the method 500 moves to step 508.

Turning to step 508, the collection module 203 collects event data requested by the interest request using the collecting device 120 and/or the navigation application 118. Optionally, the communication module 201 receives 510 a second interest request from a third node (e.g., a second road side node 106, etc.) requesting for the same event data as the first interest request. The collection module 203 sends the event data to the naming module 205. The naming module 205 converts 512 the event data to naming data that conforms to a naming structure. The naming module 205 sends the naming data to the publishing module 207. The publishing module 207 publishes 514 the naming data in a mobile node network.

Figure 6:
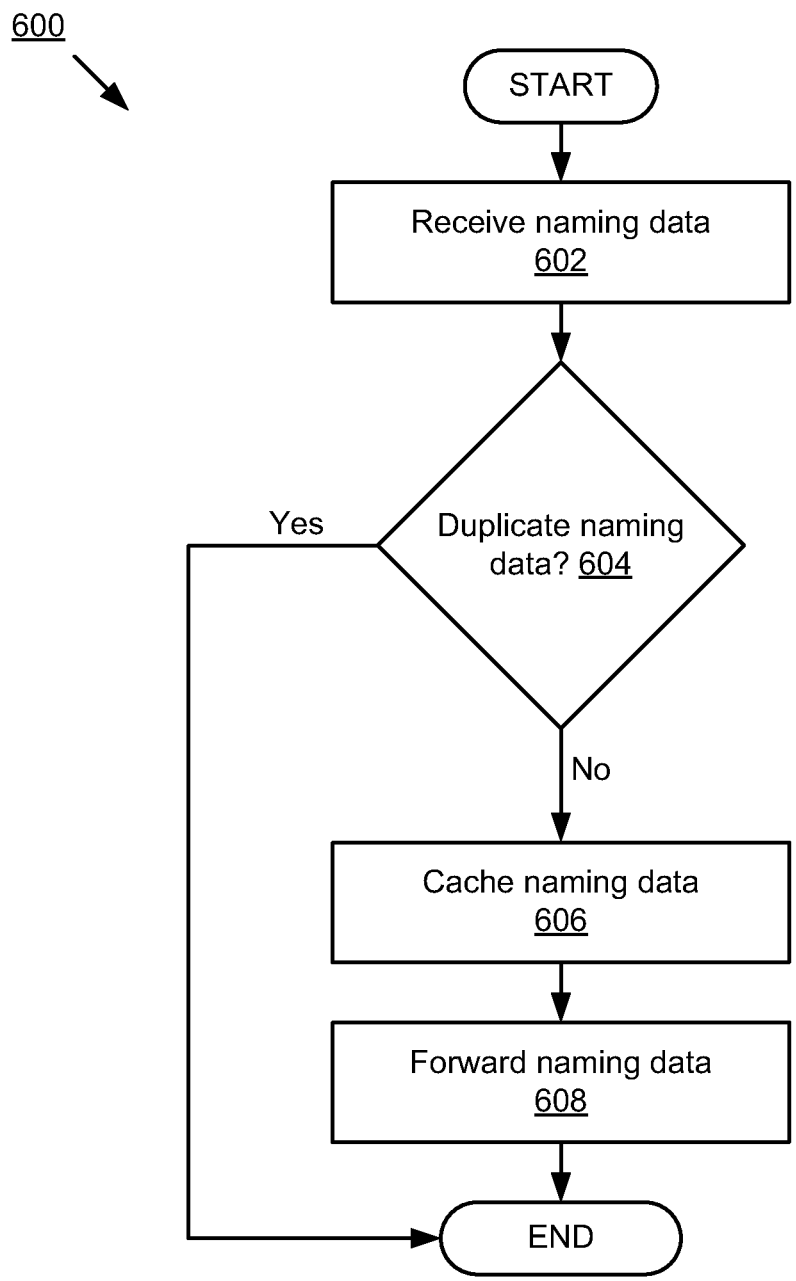
FIG. 6 is a flowchart illustrating a method for disseminating naming data according to one embodiment.

FIG. 6 is a flowchart illustrating a method 600 for disseminating naming data according to one embodiment. The communication module 201 comprised within a first node receives 602 naming data from a second node. The communication module 201 sends the received naming data to the forwarding module 215. The forwarding module 215 determines 604 whether the naming data is duplicate data. For example, the forwarding module 215 determines whether the received naming data is a duplicate of any naming data stored in the storage 239. If the naming data is a duplicate, the naming data is ignored and the method 600 ends. If the naming data is not a duplicate, the forwarding module 215 caches 606 the naming data in the storage 239. The forwarding module 215 forwards 608 the naming data to other nodes.

Figure 7A:
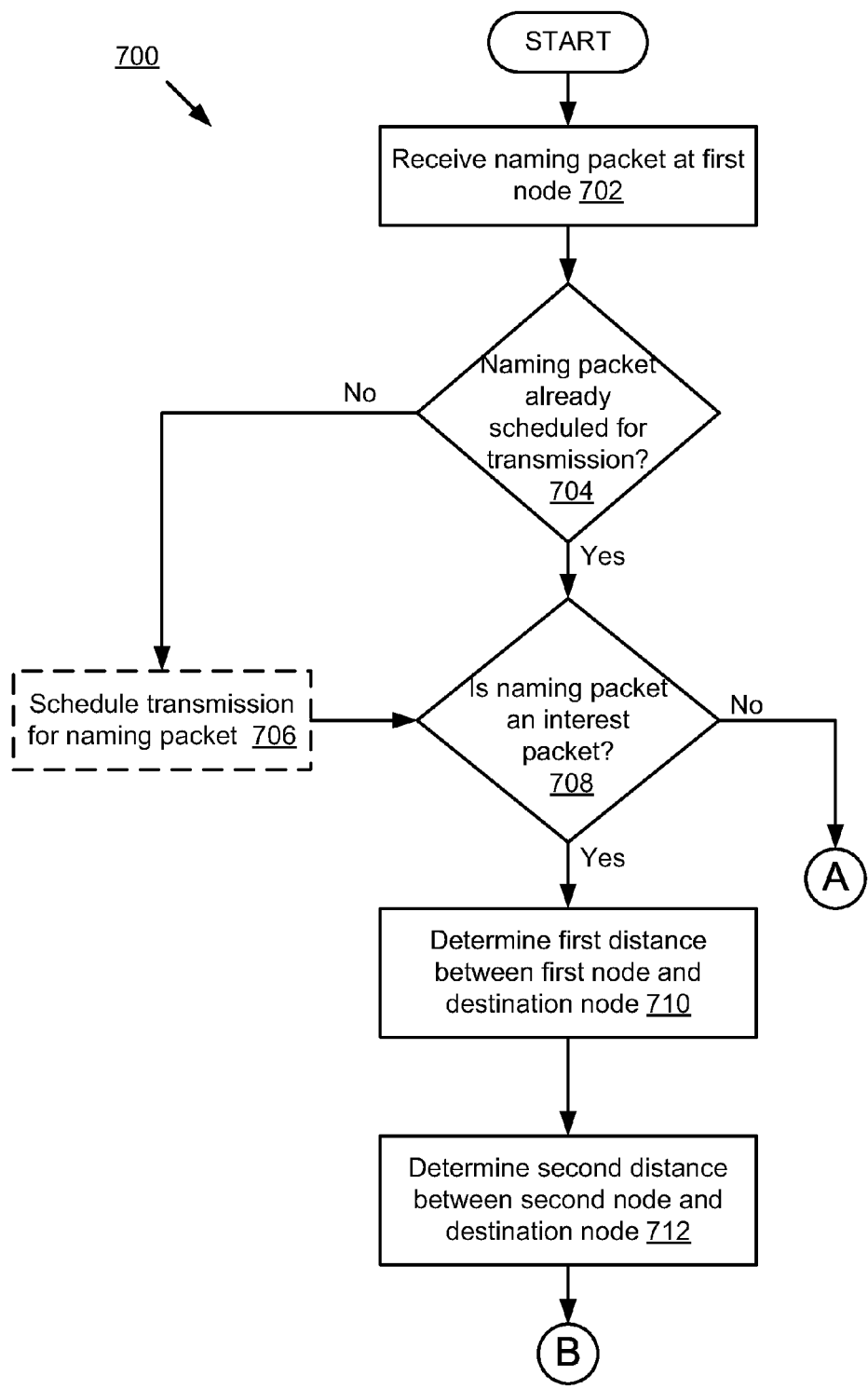
FIGS. 7A-7C are flowcharts illustrating a method for forwarding naming data according to one embodiment.
Figure 7B:
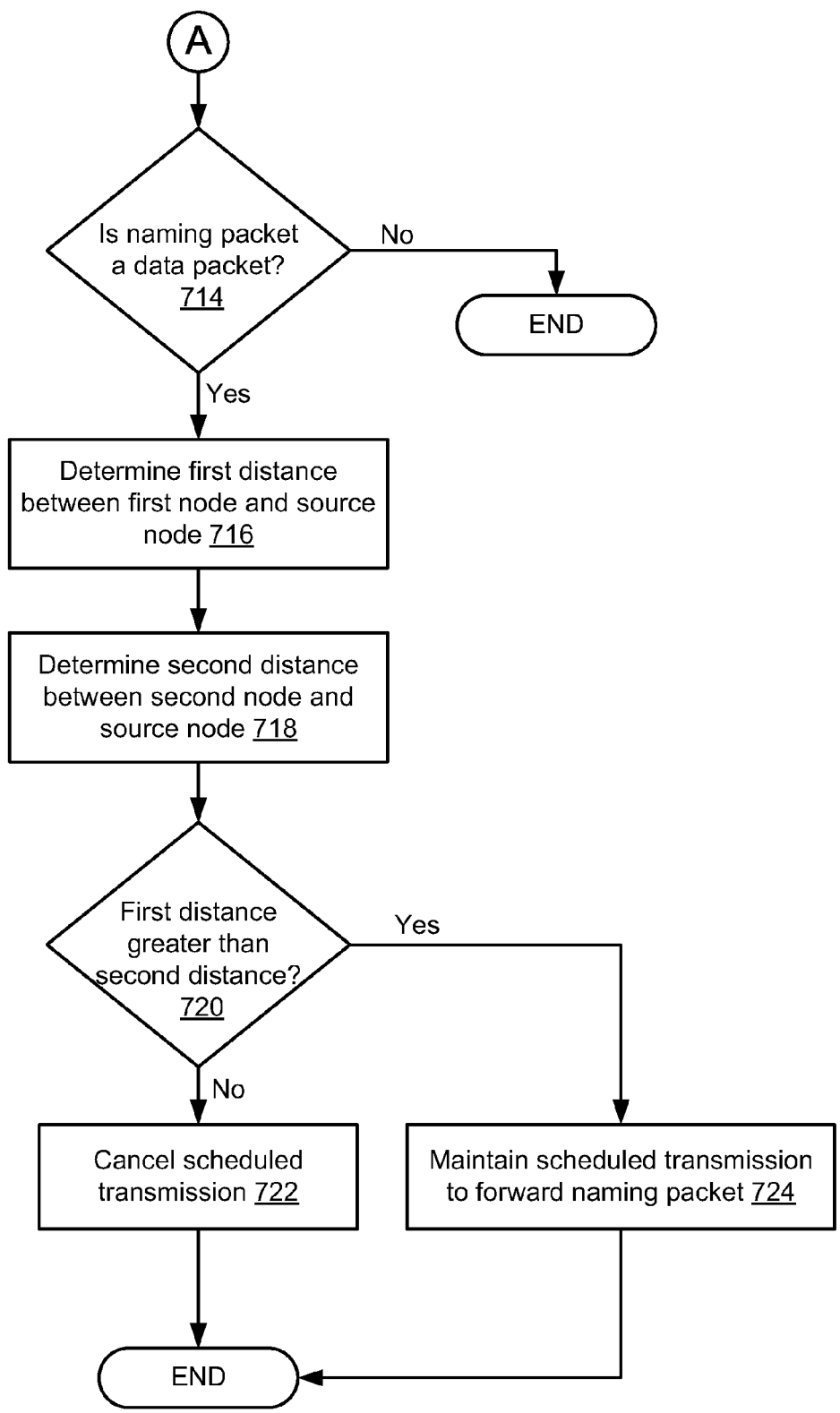
Figure 7C:
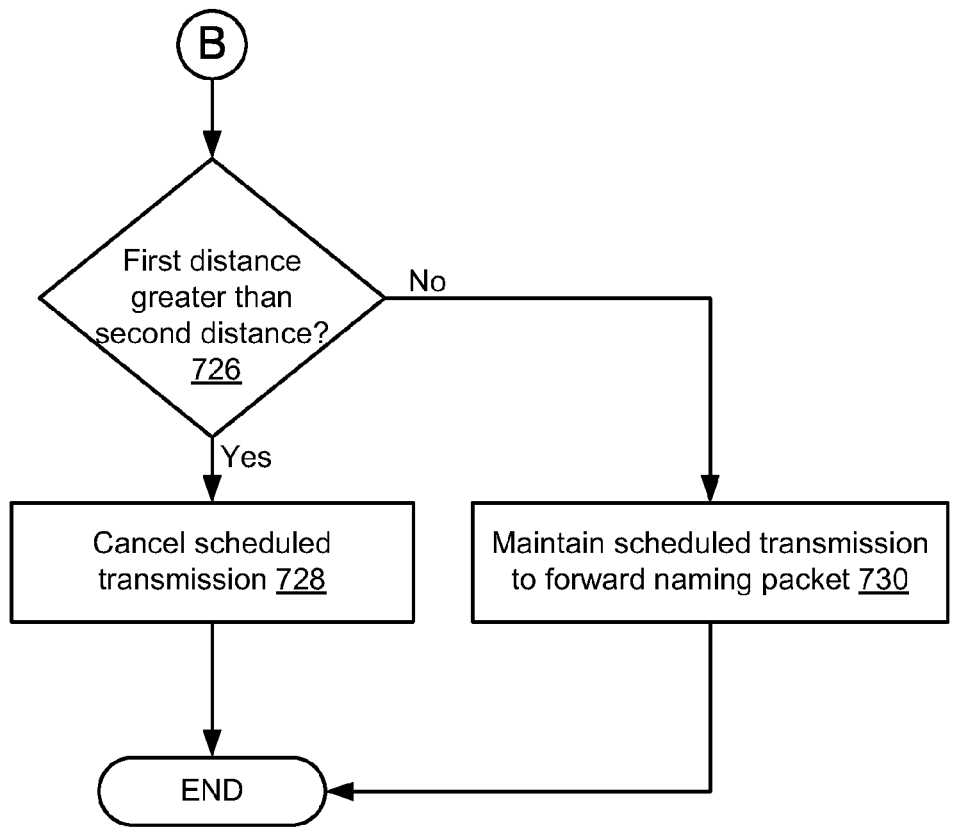

FIGS. 7A-7C are flowcharts illustrating a method 700 for forwarding naming data (e.g., a naming packet) according to one embodiment. A source node transmits a naming packet to a destination node. The destination node is outside the transmission range of the source node. However, there are at least a first node and a second node that are within the transmission range of the source node and/or the transmission range of the destination node. Referring to FIG. 7A, the communication module 201 comprised within the first node receives 702 a naming packet at the first node. The communication module 201 sends the naming packet to the forwarding module 215. The forwarding module 215 determines 704 whether a transmission of the naming data is scheduled at the first node. If transmission of the naming packet is not scheduled at the first node, the forwarding module 215 optionally schedules 706 a transmission for the naming packet. Otherwise, the method 700 moves to step 708.

Turning to step 708, the forwarding module 215 determines whether the naming packet is an interest packet. If the naming packet is not an interest packet, the method 700 moves to step 714 depicted in FIG. 7B. Otherwise, the method 700 moves to step 710. Turning to step 710, the forwarding module 215 determines a first distance between the first node and the destination node of the naming packet. The forwarding module 215 determines 712 a second distance between a second node (e.g., a publisher node 102, a road side node 106, a relay node 114, etc.) and the destination node.

Referring to FIG. 7B, the forwarding module 215 determines 714 whether the naming packet is a data packet. If the naming packet is a data packet, the method 700 moves to step 716. Otherwise, the method 700 ends. Turning to step 716, the forwarding module 215 determines a first distance between the first node and the source node of the data packet. The forwarding module 215 determines 718 a second distance between the second node and the source node of the data packet. The forwarding module 215 determines 720 whether the first distance is greater than the second distance. If the first distance is not greater than the second distance, the forwarding module 215 cancels 722 the scheduled transmission at the first node. If the first distance is greater than the second distance, the forwarding module 215 comprised within the first node maintains 724 the scheduled transmission at the first node and forwards the naming packet to the destination node.

Referring to FIG. 7C, the forwarding node 215 determines 726 whether the first distance is greater than the second distance for an interest packet transmission. If the first distance is greater than the second distance, the forwarding module 215 cancels 728 the scheduled transmission at the first node. If the first distance is not greater than the second distance, the forwarding module 215 comprised within the first node maintains 730 the scheduled transmission at the first node and forwards the naming packet to the destination node.

Figure 8A:
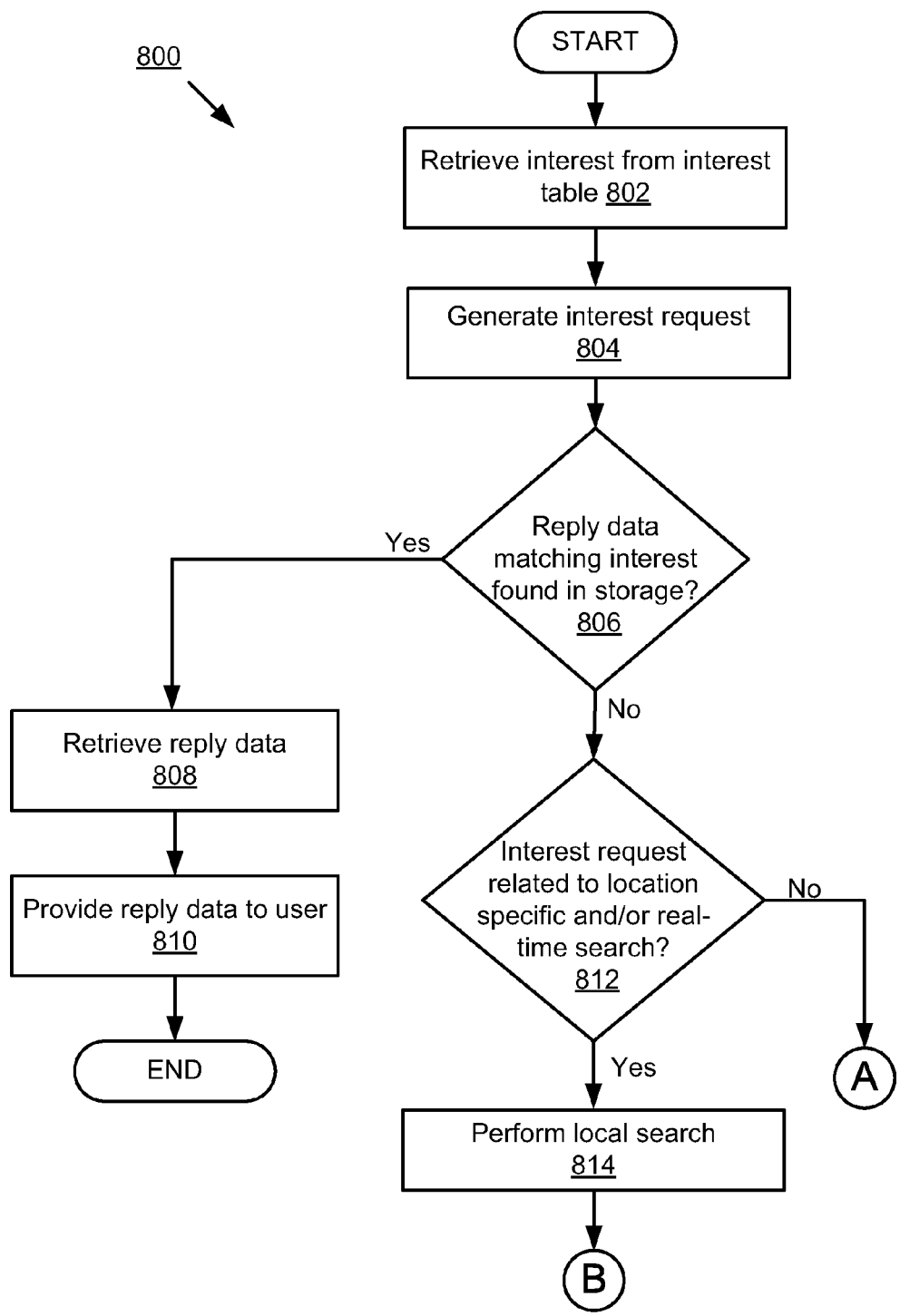
FIGS. 8A-8B are flowcharts illustrating a method for requesting naming data that matches an interest request according to one embodiment.
Figure 8B:
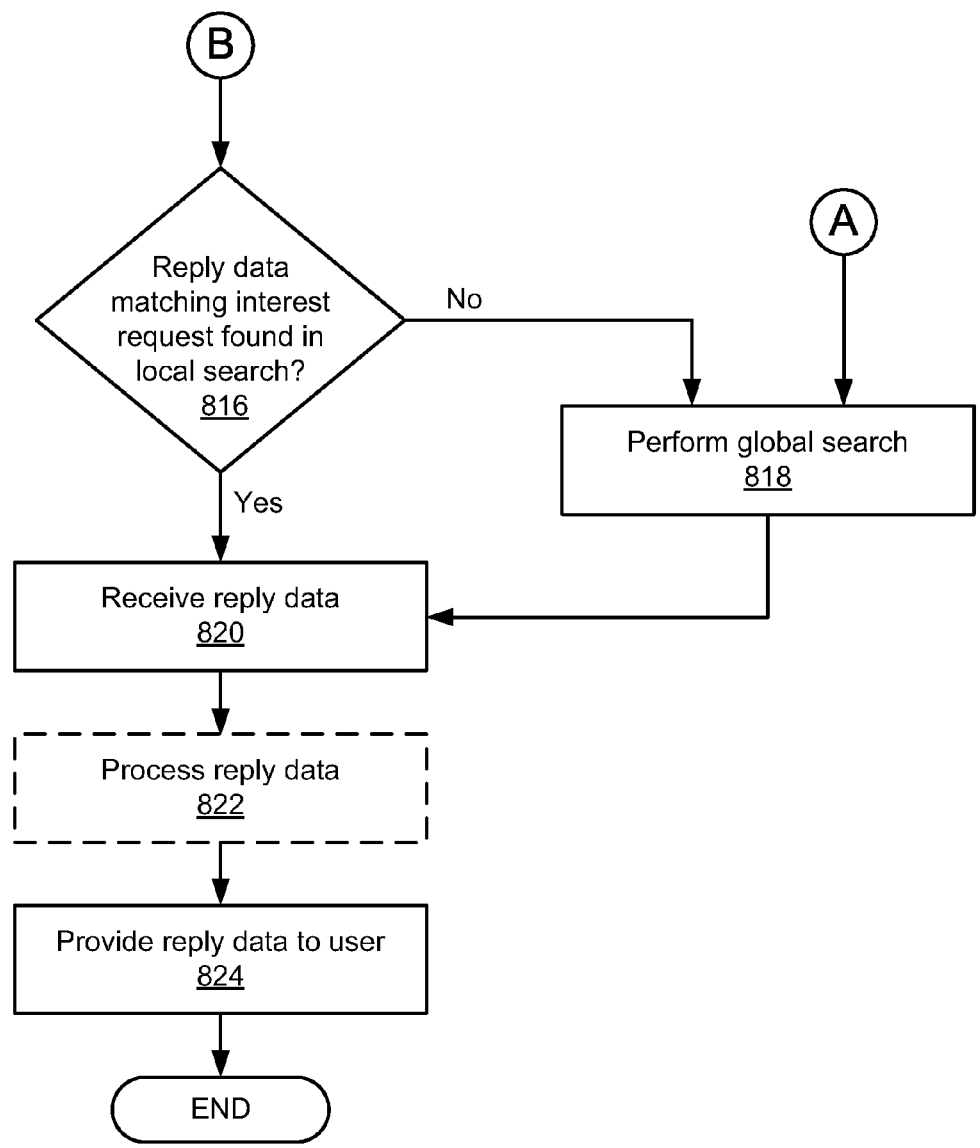

FIGS. 8A-8B are flowcharts illustrating a method 800 for requesting naming data that matches an interest request according to one embodiment. Referring to FIG. 8A, the communication module 201 comprised within a first node retrieves 802 an interest from the interest table stored in the storage 239 comprised within the first node. The interest module 209 generates 804 an interest request based at least in part on the retrieved interest. The interest module 209 sends the interest request to the reply module 213. The reply module 213 determines 806 whether reply data matching the interest is found in the storage 239 of the first node. If reply data is found in the storage 239, the reply module 213 retrieves 808 the reply data from the storage 239 and provides 810 the reply data to the user. For example, the reply module 213 instructs the GUI module 217 to generate graphical data for providing a user interface depicting the reply data. The GUI module 217 sends the graphical data to the user interface device 108, causing the user interface device 108 to present the user interface to the user.

If no reply data is found in the storage 239 of the first node, the interest module 209 sends the interest request to the search module 211. The search module 211 determines 812 whether the interest request is related to a location specific and/or real-time search. If the search is related to a location specific and/or real-time search, the search module 211 performs 814 a local search in a mobile node network. Otherwise, the method 800 moves to step 818 depicted in FIG. 8B.

Referring now to FIG. 8B, the search module 211 determines 816 whether reply data matching the interest request is found in the local search. If no matching reply data is found in the local search, the method 800 moves to step 818. Otherwise, the method 800 moves to step 820. Turning to step 818, the search module 211 performs a global search using the content server 122. In one embodiment, the reply module 213 receives 820 the reply data from a local search or a global search. Optionally, the reply module 213 processes 822 the reply data. The reply module 213 provides 824 the reply data to the user.

Figure 9:
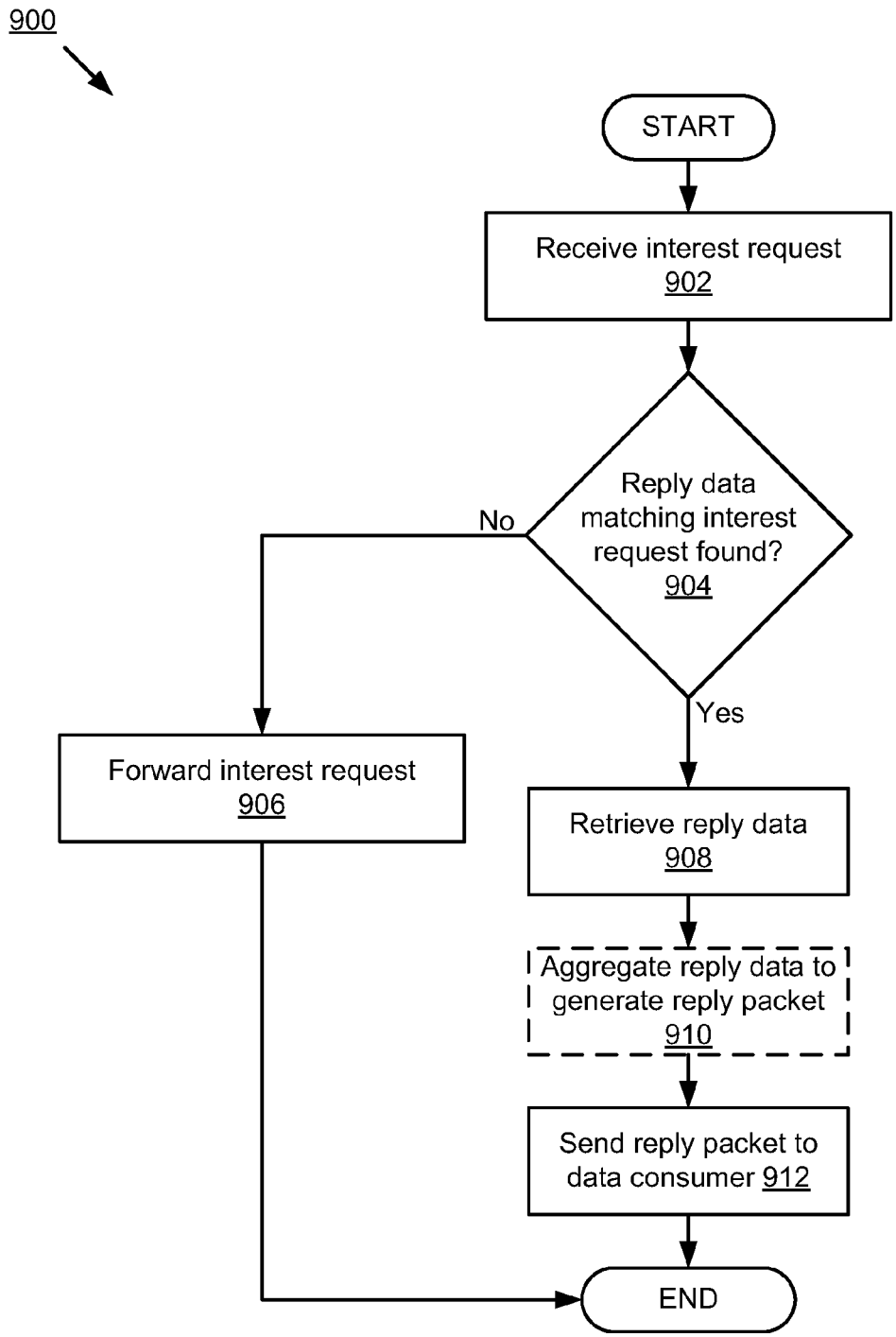
FIG. 9 is a flowchart illustrating a method for determining naming data that matches an interest request according to one embodiment.

FIG. 9 is a flowchart illustrating a method 900 for determining naming data that matches an interest request according to one embodiment. The communication module 201 comprised within a first node receives 902 an interest request from a second node. The communication module 201 sends the interest request to the reply module 213 comprised within the first node. The reply module 213 determines 904 whether reply data matching the interest request is found in the storage 239. If no reply data is found in the storage 239, the reply module 213 instructs the forwarding module 215 to forward 906 the interest request to other nodes.

If reply data is found in the storage 239, the reply module 213 retrieves 908 the reply data from the storage 239. Optionally, the reply module 213 aggregates 910 the reply data to generate a reply packet. The reply module 213 sends 912 the reply packet to a node (e.g., a data consumer node 112) that generates the interest request.

FIG. 10A is a graphic representation 1000 illustrating a process to forward a data packet according to one embodiment. In the illustrated embodiment, a node 1002 represents a source node of the data packet. For example, the node 1002 is a publisher node 102 that publishes the data packet. In another example, the node 1002 is a relay node 114 that disseminates the data packet in a mobile node network. A node 1004 and a node 1006 represent two nodes between the source node 1002 and a destination node 1008. The dashed line circle 1003 indicates that both the node 1004 and the node 1006 are within the transmission range of the source node 1002.

In the illustrated embodiment, the node 1006 is further away from the source node 1002 than the node 1004. Or, the node 1006 is closer to the destination node 1008 than the node 1004. If the node 1004 forwards the data packet received from the source node 1002, the node 1006 needs to forward the data packet to the destination node 1008 again because the node 1004 may be out of the transmission range of the destination node 1008. However, if the node 1006 forwards the data packet received from the source node 1002, the node 1004 is not allowed to forward the data packet again. In this scenario, only the node 1006 is selected to forward the data packet from the source node 1002 to the destination node 1008.

In the illustrated embodiment, the forwarding module 215 determines a first distance 1010 from the source node 1002 to the node 1004 and a second distance 1012 from the source node 1002 to the node 1006. Because the first distance 1010 is less than the second distance 1012 as illustrated in the depicted embodiment which means the node 1006 is further away from the source node 1002 than the node 1004, the data packet is forwarded from the source node 1002 to the node 1006. The node 1006 forwards the data packet to the destination node 1008. If the node 1004 has scheduled a transmission of the data packet, the node 1004 needs to cancel the transmission.

FIG. 10B is a graphic representation 1050 illustrating a process to forward an interest packet according to one embodiment. In the illustrated embodiment, a node 1052 represents a source node of the interest packet. For example, the node 1002 is a node that has reply data matching to an interest request generated by a destination node 1058. A node 1054 and a node 1056 represent two nodes between the source node 1052 and the destination node 1058.

In the illustrated embodiment, the node 1056 is further away from the source node 1052 than the node 1054. Or, the node 1056 is closer to the destination node 1058 than the node 1054. If the node 1054 forwards the interest packet received from the source node 1052, the node 1056 needs to forward the interest packet to the destination node 1058 again because the node 1054 may be out of the transmission range of the destination node 1058. However, if the node 1056 forwards the interest packet received from the source node 1052, the node 1054 is not allowed to forward the interest packet again. In this scenario, only the node 1056 is selected to forward the interest packet from the source node 1052 to the destination node 1058.

The forwarding module 215 determines a first distance 1062 from the destination node 1058 to the node 1054 and a second distance 1060 from the destination node 1058 to the node 1056. In the illustrated embodiment, the first distance 1062 is greater than the second distance 1060 which means the node 1056 is closer to the destination node 1058 than the node 1054. The interest packet is forwarded from the source node 1052 to the node 1056, and the node 1056 forwards the interest packet to the destination node 1058. If a transmission of the interest packet is scheduled at the node 1054, the node 1054 needs to cancel the scheduled transmission of the interest packet.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method for dynamic data publication and dissemination in a mobile node network, the method comprising:
   collecting sensor data;
   detecting a road event based at least in part on the sensor data;
   generating event data that describes the road event;
   converting the event data to a first set of naming data that conforms to a naming structure, the naming structure including an application identifier that identifies an application for the road event and a location that identifies a geographical scope for the road event;
   caching the first set of naming data in a storage device;
   publishing the first set of naming data in the mobile node network;
   receiving a second set of naming data conforming to the naming structure at a first node, the second set of naming data describing an interest packet and including location data for a destination node;
   determining whether the interest packet is scheduled for transmission at the first node;
   responsive to determining that the interest packet is scheduled for transmission at the first node, determining a first distance between the destination node and the first node;
   determining a second distance between the destination node and a second node located within a transmission range of the destination node;
   determining whether the first distance is greater than the second distance; and
   responsive to determining that the first distance is greater than the second distance, canceling the transmission of the interest packet at the first node.

2. The method of claim 1, wherein the naming structure further includes a timestamp that identifies a temporal scope for the road event, a data type indicating a category for the road event and a name identifier that identifies the first set of naming data.

3. The method of claim 1, further comprising:
   receiving an interest request from a consumer node;
   determining whether reply data matching an interest included in the interest request is found in the storage device;
   responsive to determining that the reply data is found, retrieving the reply data from the storage device;
   aggregating the reply data to generate a reply packet; and
   sending the reply packet to the consumer node.

4. The method of claim 1, further comprising:
   receiving a third set of naming data conforming to the naming structure;
   caching the third set of naming data in the storage device; and forwarding the third set of naming data to one or more nodes in the mobile node network.

5. The method of claim 1, further comprising:
generating an interest request including an interest;
determining whether the interest request relates to at least one of a location-specific search and a real-time search; and
responsive to determining that the interest request relates to at least one of the location-specific search and the real-time search, performing a local search for the interest request.

6. A method for dynamic data publication and dissemination in a mobile node network, the method comprising:
collecting sensor data;
detecting a road event based at least in part on the sensor data;
generating event data that describes the road event;
converting the event data to a first set of naming data that conforms to a naming structure, the naming structure including an application identifier that identifies an application for the road event and a location that identifies a geographical scope for the road event;
caching the first set of naming data in a storage device;
publishing the first set of naming data in the mobile node network;
receiving a second set of naming data conforming to the naming structure at a first node, the second set of naming data describing a data packet and including location data describing a source node;
determining whether the data packet is scheduled for transmission at the first node;
responsive to determining that the data packet is scheduled for transmission at the first node, determining a first distance between the source node and the first node;
determining a second distance between the source node and a second node located within a transmission range of the source node;
determining whether the first distance is less than the second distance; and
responsive to determining that the first distance is less than the second distance, canceling the transmission of the data packet at the first node.

7. The method of claim 6, wherein the naming structure further includes a timestamp that identifies a temporal scope for the road event, a data type indicating a category for the road event and a name identifier that identifies the first set of naming data.

8. The method of claim 6, further comprising:
receiving an interest request from a consumer node;
determining whether reply data matching an interest included in the interest request is found in the storage device;
responsive to determining that the reply data is found, retrieving the reply data from the storage device;
aggregating the reply data to generate a reply packet; and
sending the reply packet to the consumer node.

9. The method of claim 6, further comprising:
receiving a third set of naming data conforming to the naming structure;
caching the third set of naming data in the storage device; and
forwarding the third set of naming data to one or more nodes in the mobile node network.

10. The method of claim 6, further comprising:
generating an interest request including an interest;
determining whether the interest request relates to at least one of a location-specific search and a real-time search; and
responsive to determining that the interest request relates to at least one of the location-specific search and the real-time search, performing a local search for the interest request.

11. A system for dynamic data publication and dissemination in a mobile node network, the system comprising:
one or more processors;
a collection module executable by the one or more processors to collect sensor data, the collection module further executable to detect a road event based at least in part on the sensor data and to generate event data that describes the road event;
a naming module executable by the one or more processors and communicatively coupled to the collection module, the naming module executable to convert the event data to a first set of naming data that conforms to a naming structure, the naming structure including an application identifier that identifies an application for the road event and a location that identifies a geographical scope for the road event, the naming module further executable to cache the first set of naming data in a storage device;
a publishing module executable by the one or more processors and communicatively coupled to the naming module and collection module, the publishing module executable to publish the first set of naming data in the mobile node network;
a communication module executable by the one or more processors and communicatively coupled to the collection module, the naming module and the publishing module, the communication module executable to receive a second set of naming data conforming to the naming structure at a first node, the second set of naming data describing an interest packet and including location data for a destination node; and
a forwarding module executable by the one or more processors and communicatively coupled to the communication module, the forwarding module executable to:
determine whether the interest packet is scheduled for transmission at the first node;
responsive to determining that the interest packet is scheduled for transmission at the first node, determine a first distance between the destination node and the first node;
determine a second distance between the destination node and a second node located within a transmission range of the destination node;
determine whether the first distance is greater than the second distance; and
responsive to determining that the first distance is greater than the second distance, cancel the transmission of the interest packet at the first node.

12. The system of claim 11, wherein the naming structure further includes a timestamp that identifies a temporal scope for the road event, a data type indicating a category for the road event and a name identifier that identifies the first set of naming data.

13. The system of claim 11, wherein the communication module is further executable to receive an interest request from a consumer node and to send a reply packet to the consumer node, and the system further comprises:
a reply module executable by the one or more processors and communicatively coupled to the communication module, the collection module, the naming module and the publishing module, the reply module executable to:
- determine whether reply data matching an interest included in the interest request is found in the storage device;
- responsive to determining that the reply data is found, retrieve the reply data from the storage device; and
- aggregate the reply data to generate the reply packet.

14. The system of claim 11, wherein the communication module is further executable to receive a third set of naming data conforming to the naming structure, and
the forwarding module is further executable to cache the third set of naming data in the storage device and to forward the third set of naming data to one or more nodes in the mobile node network.

15. The system of claim 11, further comprising:
an interest module executable by the one or more processors and communicatively coupled to the collection module, the naming module and the publishing module, the interest module executable to generate an interest request including an interest; and
a search module executable by the one or more processors and communicatively coupled to the interest module, the search module executable to determine whether the interest request relates to at least one of a location-specific search and a real-time search, responsive to determining that the interest request relates to at least one of the location-specific search and the real-time search, the search module further executable to perform a local search for the interest request.

16. A system for dynamic data publication and dissemination in a mobile node network, the system comprising:
one or more processors;
a collection module executable by the one or more processors to collect sensor data, the collection module further executable to detect a road event based at least in part on the sensor data and to generate event data that describes the road event;
a naming module executable by the one or more processors and communicatively coupled to the collection module, the naming module executable to convert the event data to a first set of naming data that conforms to a naming structure, the naming structure including an application identifier that identifies an application for the road event and a location that identifies a geographical scope for the road event, the naming module further executable to cache the first set of naming data in a storage device;
a publishing module executable by the one or more processors and communicatively coupled to the naming module and collection module, the publishing module executable to publish the first set of naming data in the mobile node network;
a communication module executable by the one or more processors and communicatively coupled to the collection module, the naming module and the publishing module, the communication module executable to receive a second set of naming data conforming to the naming structure at a first node, the second set of naming data describing a data packet and including location data describing a source node; and
a forwarding module executable by the one or more processors and communicatively coupled to the communication module, the forwarding module executable to:
- determine whether the data packet is scheduled for transmission at the first node;
- responsive to determining that the data packet is scheduled for transmission at the first node, determine a first distance between the source node and the first node;
- determine a second distance between the source node and a second node located within a transmission range of the source node;
- determine whether the first distance is less than the second distance; and
- responsive to determining that the first distance is less than the second distance, cancel the transmission of the data packet at the first node.

17. The system of claim 16, wherein the naming structure further includes a timestamp that identifies a temporal scope for the road event, a data type indicating a category for the road event and a name identifier that identifies the first set of naming data.

18. The system of claim 16, wherein the communication module is further executable to receive an interest request from a consumer node and to send a reply packet to the consumer node, and the system further comprises:
a reply module executable by the one or more processors and communicatively coupled to the communication module, the collection module, the naming module and the publishing module, the reply module executable to:
- determine whether reply data matching an interest included in the interest request is found in the storage device;
- responsive to determining that the reply data is found, retrieve the reply data from the storage device; and
- aggregate the reply data to generate the reply packet.

19. The system of claim 16, wherein
the communication module is further executable to receive a third set of naming data conforming to the naming structure, and
the forwarding module is further executable to cache the third set of naming data in the storage device and to forward the third set of naming data to one or more nodes in the mobile node network.

20. The system of claim 16, further comprising:
an interest module executable by the one or more processors and communicatively coupled to the collection module, the naming module and the publishing module, the interest module executable to generate an interest request including an interest; and
a search module executable by the one or more processors and communicatively coupled to the interest module, the search module executable to determine whether the interest request relates to at least one of a location-specific search and a real-time search, responsive to determining that the interest request relates to at least one of the location-specific search and the real-time search, the search module further executable to perform a local search for the interest request.

21. A computer program product comprising a non-transitory computer readable medium encoding instructions that, in response to execution by a computing device, cause the computing device to perform operations comprising:
collecting sensor data;
detecting a road event based at least in part on the sensor data;
generating event data that describes the road event;
converting the event data to a first set of naming data that conforms to a naming structure, the naming structure including an application identifier that identifies an application for the road event and a location that identifies a geographical scope for the road event;
caching the first set of naming data in a storage device;

publishing the first set of naming data in the mobile node network;

receiving a second set of naming data conforming to the naming structure at a first node, the second set of naming data describing an interest packet and including location data for a destination node;

determining whether the interest packet is scheduled for transmission at the first node;

responsive to determining that the interest packet is scheduled for transmission at the first node, determining a first distance between the destination node and the first node;

determining a second distance between the destination node and a second node located within a transmission range of the destination;

determining whether the first distance is greater than the second distance; and responsive to determining that the first distance is greater than the second distance, canceling the transmission of the interest packet at the first node.

22. The computer program product of claim 21, wherein the naming structure further includes a timestamp that identifies a temporal scope for the road event, a data type indicating a category for the road event and a name identifier that identifies the first set of naming data.

23. The computer program product of claim 21, wherein the instructions cause the computing device to perform operations further comprising:

receiving an interest request from a consumer node;

determining whether reply data matching an interest included in the interest request is found in the storage device;

responsive to determining that the reply data is found, retrieving the reply data from the storage device;

aggregating the reply data to generate a reply packet; and sending the reply packet to the consumer node.

24. The computer program product of claim 21, wherein the instructions cause the computing device to perform operations further comprising:

generating an interest request including an interest;

determining whether the interest request relates to at least one of a location-specific search and a real-time search; and responsive to determining that the interest request relates to at least one of the location-specific search and the real-time search, performing a local search for the interest request.

25. A computer program product comprising a non-transitory computer readable medium encoding instructions that, in response to execution by a computing device, cause the computing device to perform operations comprising:

collecting sensor data;

detecting a road event based at least in part on the sensor data;

generating event data that describes the road event;

converting the event data to a first set of naming data that conforms to a naming structure, the naming structure including an application identifier that identifies an application for the road event and a location that identifies a geographical scope for the road event;

caching the first set of naming data in a storage device;

publishing the first set of naming data in the mobile node network;

receiving a second set of naming data conforming to the naming structure at a first node, the second set of naming data describing a data packet and including location data describing a source node;

determining whether the data packet is scheduled for transmission at the first node;

responsive to determining that the data packet is scheduled for transmission at the first node, determining a first distance between the source node and the first node;

determining a second distance between the source and a second node located within a transmission range of the source node;

determining whether the first distance is less than the second distance; and responsive to determining that the first distance is less than the second distance, canceling the transmission of the data packet at the first node.

26. The computer program product of claim 25, wherein the naming structure further includes a timestamp that identifies a temporal scope for the road event, a data type indicating a category for the road event and a name identifier that identifies the first set of naming data.

27. The computer program product of claim 25, wherein the instructions cause the computing device to perform operations further comprising:

receiving an interest request from a consumer node;

determining whether reply data matching an interest included in the interest request is found in the storage device;

responsive to determining that the reply data is found, retrieving the reply data from the storage device;

aggregating the reply data to generate a reply packet; and sending the reply packet to the consumer node.

28. The computer program product of claim 25, wherein the instructions cause the computing device to perform operations further comprising:

generating an interest request including an interest;

determining whether the interest request relates to at least one of a location-specific search and a real-time search; and responsive to determining that the interest request relates to at least one of the location-specific search and the real-time search, performing a local search for the interest request.

* * * * *